United States Patent [19]

Merz et al.

[11] 3,887,686

[45] June 3, 1975

[54] PHARMACEUTICAL COMPOSITIONS CONTAINING A 2-(FURYL-METHYL)-6,7-BENZOMORPHAN AND METHOD OF USE

[75] Inventors: Herbert Merz; Adolf Langbein; Helmut Wick; Klaus Stockhaus, all of Ingelheim am Rhein, Germany

[73] Assignee: Boehringer Ingelheim GmbH, Ingelheim am Rhein, Germany

[22] Filed: Jan. 24, 1974

[21] Appl. No.: 436,168

Related U.S. Application Data

[62] Division of Ser. No. 222,669, Feb. 1, 1972, Pat. No. 3,823,150.

[30] Foreign Application Priority Data

Feb. 8, 1971 Germany.............................. 2105743
Feb. 25, 1971 Germany.............................. 2108954

[52] U.S. Cl. ............................................... 424/267
[51] Int. Cl. ............................................. A61k 27/00
[58] Field of Search ..................................... 424/267

[56] References Cited
UNITED STATES PATENTS

| | | | |
|---|---|---|---|
| 2,924,603 | 2/1960 | Gordon et al.................. | 260/293.54 |
| 3,138,603 | 6/1964 | May.................................. | 424/267 |
| 3,250,678 | 5/1966 | Archer.............................. | 424/267 |
| 3,351,626 | 11/1967 | Bartels-Keith et al. ......... | 260/293.54 |

*Primary Examiner*—Albert T. Meyers
*Assistant Examiner*—Norman A. Drezin
*Attorney, Agent, or Firm*—Hammond & Littell

[57] ABSTRACT

Pharmaceutical dosage unit compositions containing as the active ingredient a compound of the formula

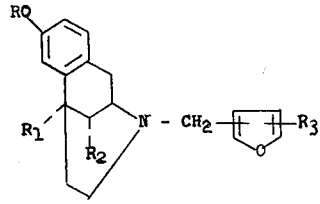

wherein
R is hydrogen, methyl or acetyl,
$R_1$ is hydrogen, methyl, ethyl, n-propyl, isopropyl or butyl, and
$R_2$ and $R_3$ are each hydrogen, methyl or ethyl,
or a non-toxic, pharmacologically acceptable acid addition salt thereof; and a method of using the same as opiate antagonists, non-narcotic analgesics and antitussives.

13 Claims, No Drawings

PHARMACEUTICAL COMPOSITIONS CONTAINING A 2-(FURYL-METHYL)-6,7-BENZOMORPHAN AND METHOD OF USE

This is a division of copending application Ser. No. 222,669, filed Feb. 1, 1972, now U.S. Pat. No. 3,823,150 issued July 9, 1974.

This invention relates to novel pharmaceutical compositions containing as the active ingredient a 2-(furylmethyl)-6,7-benzomorphan or a non-toxic acid addition salt thereof, and a method of using the same as opiate antagonists, non-narcotic analgesics and antitussives.

More particularly, the present invention relates to novel pharmaceutical dosage unit compositions containing as the active ingredient a compound of the formula

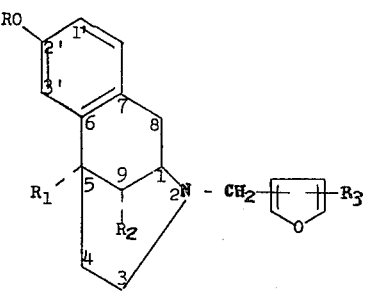

(I)

wherein

R is hydrogen, methyl or acetyl, $R_1$ is hydrogen, methyl, ethyl, n-propyl, isopropyl or butyl, preferably hydrogen, and $R_2$ and $R_3$ are each hydrogen, methyl or ethyl, or a non-toxic, pharmacologically acceptable acid addition salt thereof.

In formula I the substituents $R_1$ and $R_2$ are in cisconfiguration. The compounds are optically active. Thus, formula I embraces optically inactive racemates or racemic mixtures, as well as the pure optical isomers.

The compounds embraced by formula I may be prepared by a number of different methods, among which the following, each starting from a benzomorphan of the formula

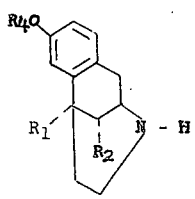

(II)

wherein $R_1$ and $R_2$ have the same meanings as in formula I, and $R_4$ is hydrogen, alkyl, aralkyl or acyl, have proved to be particularly convenient and efficient.

Method A

The reaction sequence for this method may be schematically represented as follows:

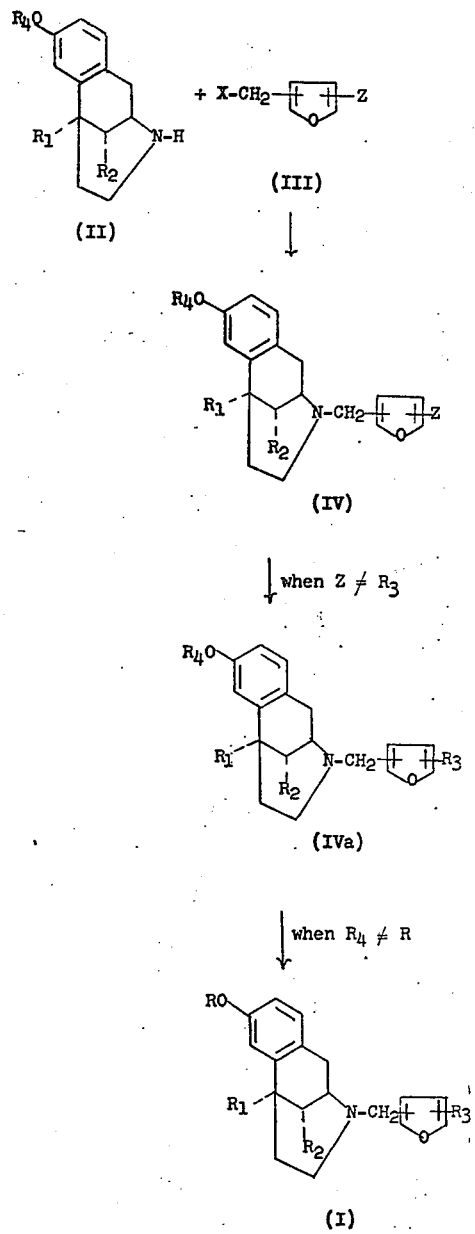

where

R = H, $CH_3$, $CH_3CO$ $R_1$ = $CH_3$, $C_2H_5$, n-$C_3H_7$, i-$C_3H_7$, $C_4H_9$, H $R_2$ = $CH_3$, $C_2H_5$, H $R_3$ = H, $CH_3$, $C_2H_5$ $R_4$ = H, alkyl, aralkyl, acyl Z = H, $CH_3$, $C_2H_5$ or a substituent which can be converted into H, $CH_3$ or $C_2H_5$, and X = halogen, preferably chlorine or bromine, alkyl-$SO_2$-O or aryl-$SO_2$-O.

More particularly, the preparation of a compound of the formula I by this method comprises reacting a 6,7-benzomorphan of the formula II with a furan derivative of the formula III to form a compound of the formula IV; if Z in intermediate IV is other than the ultimately desired meaning of $R_3$, converting substitutent Z by chemical reaction into hydrogen, methyl or ethyl to form an intermediate of the formula IVa; if $R_4$ in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein $R_4$ is hydrogen.

The benzomorphan of the formula II is reacted with the calculated amount or a slight excess of the furan derivative of the formula III in the presence of an acid-binding agent. Examples of suitable acid-binding agents are amines, such as trimethylamine or dicyclohexyl-ethylamine; alkali metal carbonates, such as sodium carbonate or potassium carbonate; alkali metal bicarbonates, preferably sodium bicarbonate; metal hydroxides; and metal oxides. The reaction is advantageously performed in the presence of an inert organic solvent medium, such as tetrahydrofuran, dioxane, methylene chloride, dimethylformamide, dimethylsulfoxide, or preferably a mixture of tetrahydrofuran and dimethylformamide. The reaction temperature is variable between wide limits, but temperatures between 0°C. and the boiling point of the particular solvent medium are preferred.

The other reactions of this method are performed in accordance with conventional procedures, and the reaction products are isolated and crystallized in conventional fashion.

Method B

The reaction sequence for this method may be schematically represented as follows:

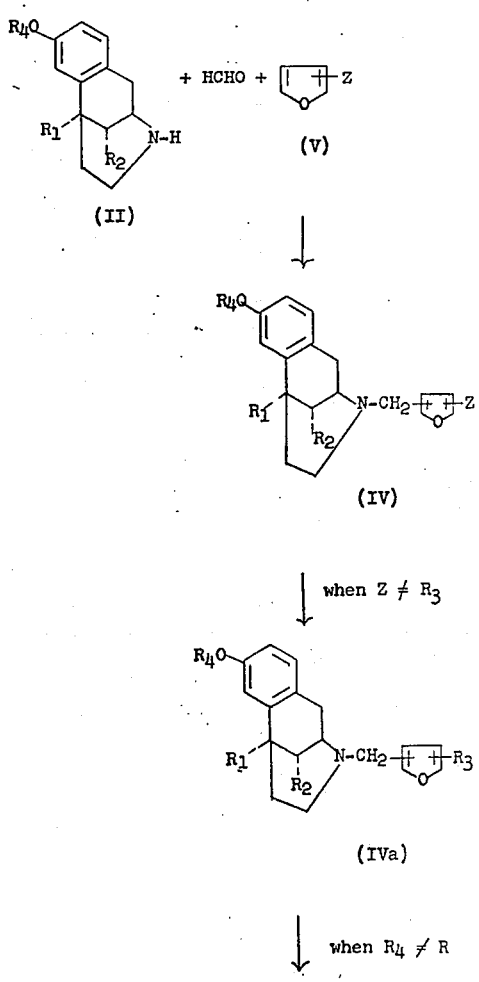

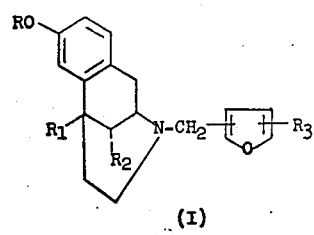

where
$R = H, CH_3, CH_3CO$
$R_1 = CH_3, C_2H_5, n\text{-}C_3H_7, i\text{-}C_3H_7, C_4H_9, H$
$R_2 = CH_3, C_2H_4, H$
$R_3 = H, CH_3, C_2H_5$
$R_4 = H$, alkyl, aralkyl, acyl, and
$Z = H, CH_3, C_2H_5$ or a substituent which can be converted into $H, CH_3$ or $C_2H_5$.

More particularly, the preparation of a compound of the formula I by this method comprises reacting a 6,7-benzomorphan of the formula II with formaldehyde and a furan derivative of the formula V to form a compound of the formula IV; if Z in intermediate IV is other than the ultimately desired meaning of $R_3$, converting substituent Z by chemical reaction into hydrogen, methyl or ethyl to form an intermediate of the formula IVa; if $R_4$ in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein $R_4$ is hydrogen.

The reaction of the benzomorphan of the formula II with formaldehyde and the furan derivative of the formula V is effected in an aqueous solution of a weak acid, especially of acetic acid, and preferably in aqueous 50% acetic acid. Other suitable solvent media are water, alcohols, tetrahydrofuran, dioxane or the like, as well as mixtures of two or more of these. The calculated amount or a slight excess of the furan derivative of the formula V is provided in solution or suspension in the solvent medium. The formaldehyde may be provided in the form of paraformaldehyde or preferably in aqueous solution; in either case it is provided in the calculated amount or in excess thereover. The reaction may be performed at a temperature between −10°C. and the boiling point of the particular solvent medium, but the preferred temperature range is 0° to 40°C.

The other reactions of this method are performed in accordance with conventional procedures, and the reaction products are isolated and crystallized in conventional fashion.

Method C

The reaction sequence for this method may be schematically represented as follows

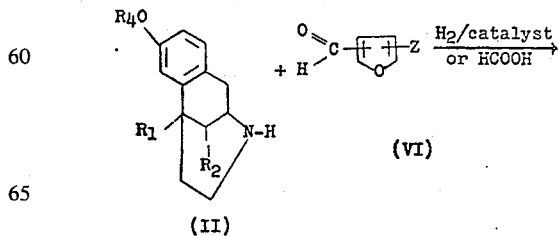

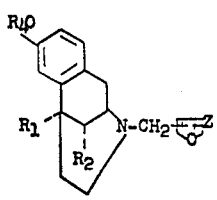

(IV)

when Z ≠ R$_3$

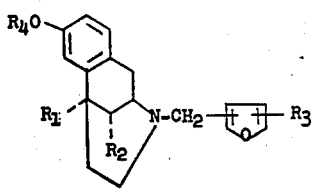

(IVa)

when R$_4$ ≠ R

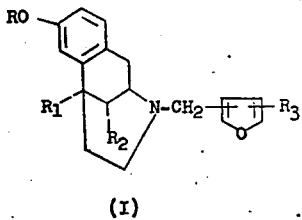

(I)

where
R = H, CH$_3$, CH$_3$CO
R$_1$ = CH$_3$, C$_2$H$_5$, n-C$_3$H$_7$, i-C$_3$H$_7$, C$_4$H$_9$, H
R$_2$ = CH$_3$, C$_2$H$_5$, H
R$_3$ = H, CH$_3$, C$_2$H$_5$
R$_4$ = H, alkyl, aralkyl, acyl, and
Z = H, CH$_3$, C$_2$H$_5$ or a substituent which can be converted into H, CH$_3$ or C$_2$H$_5$.

More particularly, the preparation of a compound of the formula I by this method comprises reacting a 6,7-benzomorphan of the formula II with a furaldehyde of the formula VI in the presence of catalytically activated hydrogen or of formic acid to form a compound of the formula IV; if Z in intermediate IV is other than the ultimately desired meaning of R$_3$, converting substituent Z by chemical reaction into hydrogen, methyl or ethyl to form an intermediate of the formula IVa; if R$_4$ in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein R$_4$ is hydrogen.

For the reductive alkylation in the presence of catalytically activated hydrogen the aldehyde of the formula VI is provided in the calculated amount or in excess, preferably in a ratio of up to 2 mols of aldehyde per mol of benzomorphan. The reaction is performed in a suitable inert solvent, such as an alkanol, preferably in methanol or ethanol. Any desired hydrogenation catalyst may be used, such as Raney nickel and related catalysts, or also noble metal catalysts, such as palladium or platinum contact catalysts; the latter may be used in finely divided form either free or applied to conventional carriers, such as charcoal, barium sulfate, calcium carbonate, infusorial earth or the like. If necessary, the activity of the catalyst may be reduced, such as by sulfidation, to avoid undesired side-reactions. The amount of catalyst is not critical and may therefore vary within wide limits. The hydrogenation is advantageously performed at atmospheric pressure or at slightly elevated pressure, preferably at 1 to 3 atmospheres gauge, accompanied by stirring or shaking. High reaction temperatures favor side-ractions; therefore, it is preferred to carry out the reductive alkylation at room temperature or moderately elevated temperatures up to about 60°C. The reaction product is isolated and crystallized by conventional methods.

The reaction of a benzomorphan of the formula II with an aldehyde of the formula VI in the presence of formic acid is preferably performed in aqueous solution, but will also proceed in an organic solvent medium. The aldehyde of the formula VI is provided in the calculated amount or in slight excess thereover, preferably in an amount of up to 1.5 mols per mol of benzomorphan. The formic acid is advantageously provided in substantial excess, preferably in an amount of up to 10 mols per mol of benzomorphan. The reaction is carried out at a temperature between 50° and 200°C., preferably at 80° to 150°C. The reaction product is isolated and crystallized by conventional procedures.

The other reactions of this method are performed in accordance with conventional procedures, and the reaction products are isolated and crystallized in conventional fashion.

Method D

The reaction sequence for this method may be schematically represented as follows:

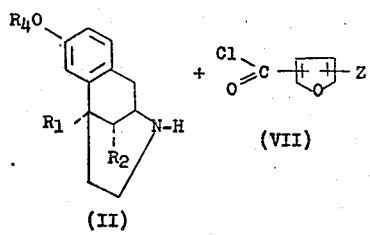

(II)           (VII)

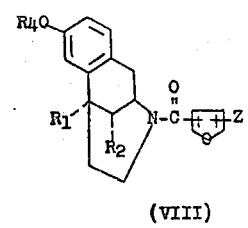

(VIII)

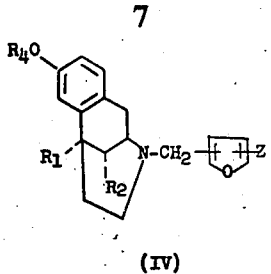

(IV)

↓ when Z ≠ R₃

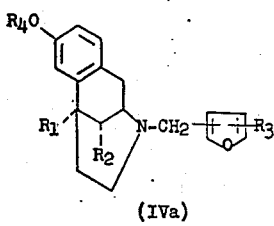

(IVa)

↓ when R₄ ≠ R

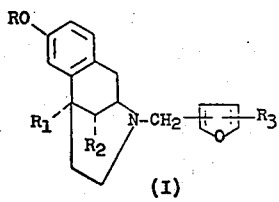

(I)

where
R = H, CH₃, CH₃CO
$R_1$ = CH₃, C₂H₅, n-C₃H₇, i-C₃H₇, C₄H₉, H
$R_2$ = CH₃, C₂H₅, H
$R_3$ = H, CH₃, C₂H₅
$R_4$ = H, alkyl, aralkyl, acyl, and
Z = H, CH₃, C₂H₅ or a substituent which can be converted into H, CH₃ or C₂H₅.

More particularly, the preparation of a compound of the formula I by this method comprises reacting a 6,7-benzomorphan of the formula II with a furan carboxylic acid chloride of the formula VII to form a compound of the formula VIII and reducing the same to a compound of the formula IV: if Z in intermediate IV is other than the ultimately desired meaning of R₃, converting substituent Z by chemical reaction into hydrogen, methyl or ethyl to form an intermediate of the formula IVa; if R₄ in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein R₄ is hydrogen.

The first step of the reaction sequence, i.e. the formation of an N-furoyl-benzomorphan of the formula VIII, is effected by the Schotten-Baumann method [see C. Schotten, Berichte 17, 2544 (1884); and E. Baumann, Berichte 19, 3218 (1886)]. If the starting compound of the formula II is one wherein R₄ is hydrogen, i.e., a 2'-hydroxy-6,7-benzomorphan, and the furancarboxylic acid chloride of the formula VII is provided in a ratio of 2 mols per mol of benzomorphan, the reaction product of the formula VIII is an N,O-difuroyl-6,7-benzomorphan, i.e., R₄ is identical to the N-substituent.

In the second step of the reaction sequence the intermediate carboxylic acid amide of the formula VIII is reduced to form a 2-furylmethyl-6,7-benzomorphan of the formula IV. Among the various suitable reduction methods it is preferred to use the reduction with a complex metal hydride, especially with lithium aluminum hydride. The complex hydride is provided in the calculated amount or, more advantageously, in excess up to twice the calculated amount. The reduction is performed in a suitable inert solvent medium, such as an ether or a mixture of ethers, and preferably in tetrahydrofuran. The reaction temperature may vary within wide limits, but the preferred range is between 0°C. and the boiling point of the particular solvent medium. If the complex metal hydride reduction is applied to an N,O-difuroyl-6,7-benzomorphan of the formula VIII, not only the carbonyl group of the N-substituent is reduced, but also the O-acyl substituent in the 2'-position is split off simultaneously, whereby a compound of the formula IV wherein R₄ is hydrogen, is obtained.

The other reactions of this method are performed in accordance with conventional procedures, and the reaction products are isolated and crystallized in conventional fashion.

In a compound of the formula IV the substituent Z may have the same meanings as R₃ or may also be a substituent which may be converted into hydrogen, methyl or ethyl, such as carboxyl, formyl, hydroxymethyl, acetyl, formylmethyl or halogen, preferably chlorine or bromine Thus, if Z in formula IV is a carboxyl group, the intermediate may be converted into a compound of the formula IVa wherein R₃ is hydrogen by decarboxylation. If Z in formula IV is formyl, hydroxymethyl, acetyl or formylmethyl, the intermediate may be converted into a compound of the formula IVa wherein R₃ is methyl or ethyl by reducion pursuant to known methods, such as catalytic hydrogenation, with sodium/alcohol, with nascent hydrogen generated by zinc/acetic acid, or by the Wolff-Kishner Reduction. Finally, if Z in formula IV is halogen, preferably chlorine or bromine, the intermediate may be converted into a compound of the formula IVa wherein R₃ is hydrogen by catalytic reduction.

The starting compounds required for methods A through D, i.e., the nor-benzomorphans of the formula II, are known compounds and may be prepared by conventional methods. The starting compounds may be optically inactive racemates or optically active antipodes; if the starting compound in methods A through D is a racemate or racemic mixture, the end product of the formula I is also a racemeate or racemic mixture, which may subsequently be separated into its optically active antipode components by conventional methods. Analogously, if the starting compound is an optically active nor-benzomorphan, the end product is the corresponding optically active compound of the formula I.

Using the above-described methods, the following specific compounds of the formula I may be prepared:

2-Furfuryl-2'-hydroxy-α-5,9-dimethyl-6,7-benzomorphan
2-Furfuryl-2'-hydroxy-α-5-methyl-9-ethyl-6,7-benzomorphan
2-Furfuryl-2'-hydroxy-α-5-ethyl-1-methyl-6,7-benzomorphan
2-Furfuryl-2'-hydroxy-α-5,9-diethyl-6,7-benzomorphan
2-(3''-Methyl-furfuryl)-2'-hydroxy-α-5,9-dimethyl-6,7-benzomorphan
2-(3''-Methyl-furfuryl)-2'-hydroxy-α-5,9-diethyl-6,7-benzomorphan
2-(3''-Methyl-furfuryl)-2'-hydroxy-α-5-methyl-9-ethyl-6,7-benzomorphan
2-(3''-Methyl-furfuryl)-2'-hydroxy-α-5-ethyl-9-methyl-6,7-benzomorphan
2-(5''-Methyl-furfuryl)-2'-hydroxy-α-5,9-dimethyl-6,7-benzomorphan
2-(5''-Methyl-furfuryl)-2'-hydroxy-α-5-methyl-9-ethyl-6,7-benzomorphan
2-(5''-Methyl-furfuryl)-2'-hydroxy-α-5-ethyl-9-methyl-6,7-benzomorphan
2-(5''-Methyl-furfuryl)-2'-hydroxy-α-5,9-diethyl-6,7-benzomorphan
2-[Furylmethyl-(3'')]-2'-hydroxy-α-5,9-dimethyl-6,7-benzomorphan
2-[Furylmethyl-(3'')]-2'-hydroxy-α-5-methyl-9-ethyl-6,7-benzomorphan
2-[Furylmethyl-(3'')]-2'-hydroxy-α-5-ethyl-9-methyl-6,7-benzomorphan
2-[Furylmethyl-(3'')]-2'-hydroxy-α-5,9-diethyl-6,7-benzomorphan
2-(5''-Ethyl-furfuryl)-2'-hydroxy-α-5,9-dimethyl-6,7-benzomorphan
2-(5''-Ethyl-furfuryl)-2'-hydroxy-α-5-methyl-9-ethyl-6,7-benzomorphan
2-(5''-Ethyl-furfuryl)-2'-hydroxy-α-5-ethyl-9-methyl-6,7-benzomorphan
2-(5''-Ethyl-furfuryl)-2'-hydroxy-α-5,9-diethyl-6,7-benzomorphan
2-[2''-Methyl-furylmethyl-(3'')]-2'-hydroxy-α-5-methyl-9-ethyl-6,7-benzomorphan
2-[2''-Methyl-furylmethyl-(3'')]-2'-hydroxy-α-5-ethyl-9-methyl-6,7-benzomorphan
2-[2''-Methyl-furylmethyl-(3'')-2'-hydroxy-α-5,9-diethyl-6,7-benzomorphan
2-[2''-Ethyl-furylmethyl-(3'')]-2'-hydroxy-α-5,9-dimethyl-6,7-benzomorphan
2-[2''-Ethyl-furylmethyl-(3'')]-2'-hydroxy-α-5-methyl-9-ethyl-6,7-benzomorphan
2-(2''-Ethyl-furylmethyl-(3'')]-2'-hydroxy-α-5-ethyl-9-methyl-6,7-benzomorphan
2-[2''-Ethyl-furylmethyl-(3'')]-2'-hydroxy-α-5,91diethyl-6,7-benzomorphan
2-(4''-Methyl-furfuryl)-2'-hydroxy-α-5,9-dimethyl-6,7-benzomorphan
2-(4''-Methyl-furfuryl)-2'-hydroxy-α-5-methyl-9-ethyl-6,7-benzomorphan
2-(4''-Methyl-furfuryl)-2'-hydroxy-α-5-ethyl-9-methyl-6,7-benzomorphan
2-(4''-Methyl-furfuryl)-2'-hydroxy-α-5,9-diethyl-6,7-benzomorphan
2-[4''-Methyl-furylmethyl-(3'')]-2'-hydroxy-α-5,9-dimethyl-6,7-benzomorphan
2-[4''-Methyl-furylmethyl-(3'')]-2'-hydroxy-α-5-methyl-9-ethyl-6,7-benzomorphan
2-[4''-Methyl-furylmethyl-(3'')]-2'-hydroxy-α-5-ethyl-9-methyl-6,7-benzomorphan
2-[4''-Methyl-furylmethyl-(3'')]-2'-hydroxy-α-5,9-diethyl-6,7-benzomorphan
2-[5''-Methyl-furylmethyl-(3'')]-2'-hydroxy-α-5,9-diemthyl-6,7-benzomorphan
2-[5''-Methyl-furylmethyl-(3'')]-2'-hydroxy-α-5-methyl-9-ethyl-6,7-benzomorphan
2-[5''-Methyl-furylmethyl-(3'')-2'-hydroxy-α-5-ethyl-9-methyl-6,7-benzomorphan
2-[5''-Methyl-furylmethyl-(3'')]-2'-hydroxy-α-5,9-diethyl-6,7-benzomorphan
2-Furfuryl-2'-acetoxy-α-5,9-dimethyl-6,7-benzomorphan
2-Furfuryl-2'-methoxy-α-5,9-dimethyl-6,7-benzomorphan
2-[Furylmethyl-(3'')]-2''-acetoxy-α-5,9-dimethyl-6,7-benzomorphan
2-[Furylmethyl-(3'')]-2'-methoxy-α-5,9-dimethyl-6,7-benzomorphan
2-(3''-Methyl-furfuryl)-2'-acetoxy-α-5,9-dimethyl-6,7-benzomorphan
2-(3''-Methyl-furfuryl)-2'-methoxy-α-5,9-dimethyl-6,7-benzomorphan
2-(5''-Methyl-furfuryl)-2''-acetoxy-α-5,9-dimethyl-6,7-benzomorphan
2-(5''-Methyl-furfuryl)-2''-methoxy-α-5,9-dimethyl-6,7-benzomorphan
2-(5''-Ethyl-furfuryl)-2''-acetoxy-α-5,9-dimethyl-6,7-benzomorphan
2-(5''-Ethyl-furfuryl)-2'-acetoxy-α-5,9-diethyl-6,7-benzomorphan
2-(5''-Ethyl-furfuryl)-2''-methoxy-α-5,9-dimethyl-6,7-benzomorphan
2-(5''-Ethylfurfuryl)-2'-methoxy-α-5,9-diethyl-6,7-benzomorphan
2-[2''-Methyl-furylmethyl-(3'')]-2'-acetoxy-α-5,9-dimethyl-6,7-benzomorphan
2-[2''-Methyl-furylmethyl-(3'')]-2'-methoxy-α-5,9-dimethyl-6,7-benzomorphan
2-[2''-Ethyl-furylmethyl-(3'')]-2'-acetoxy-α-5,9-dimethyl-6,7-benzomorphan
2-[2''-Ethyl-furylmethyl-(3'')]-2'-methoxy-α-5,9-dimethyl-6,7-benzomorphan
2-(4''-Methyl-furfuryl)-2'-acetoxy-α-5,9-dimethyl-6,7-benzomorphan
2-(4''-Methyl-furfuryl)-2'-methoxy-α-5,9-dimethyl-6,7-benzomorphan
2-[4''-Methyl-furylmethyl-(3'')]-2'-acetoxy-α-5,9-dimethyl-6,7-benzomorphan
2-[4''-Methyl-furylmethyl-(3'')]-2'-methoxy-α-5,9-dimethyl-6,7-benzomorphan
2-[5''-Methyl-furylmethyl-(3'')]-2'-acetoxy-α-5,9-dimethyl-6,7-benzomorphan
2-[5''-Methyl-furylmethyl-(3'')]-2'-methoxy-α-5,9-dimethyl-6,7-benzomorphan
2-[2''-Methyl-furylmethyl-(3'')]-2'-hydroxy-α-5,9-dimethyl-6,7-benzomorphan
2-[Furyl-methyl-(3'')]-2'-methoxy-5-methyl-6,7-benzomorphan
2-[Furyl-methyl-(3'')]-2'-methoxy-5-ethyl-6,7-benzomorphan
2-[Furyl-methyl-(3'')]-2'-acetoxy-5-methyl-6,7-benzomorphan
2-[Furyl-methyl-(3'')]-2'-acetoxy-5-ethyl-6,7-benzomorphan 2-(5''-Methyl-furfuryl)-2'-methoxy-5-methyl-6,7-benzomorphan
2-(5''-Methyl-furfuryl)-2'-methoxy-5-ethyl-6,7-benzomorphan
2-(5''-Methyl-furfuryl)-2'-acetoxy-5-methyl-6,7-benzomorphan 2-(5''-Methyl-furfuryl)-2'-acetoxy-5-ethyl-6,7-benzomorphan 2-[2''-Methyl-furylmethyl-3'')]-2'-methoxy-5-methyl-6,7-benzomorphan
2-[2''-Methyl-furylmethyl-(3'')]-2'-methoxy-5-ethyl-6,7-benzomorphan
2-[2''-Methyl-furylmethyl-(3'')]-2'-acetoxy-5-methyl-6,7-benzomorphan
2-[2''-Methyl-furylmethyl-(3'')]-2'-acetoxy-5-ethyl-6,7-benzomorphan
2-Furfuryl-2'-hydroxy-5-methyl-6,7-benzomorphan
2-Furfuryl-2'-hydroxy-5-ethyl-6,7-benzomorphan
2-Furfuryl-2'-hydroxy-5-n-propyl-6,7-benzomorphan
2-Furfuryl-2'-hydroxy-5-isopropyl-6,7-benzomorphan
2-Furfuryl-2'-hydroxy-3-n-butyl-6,7-benzomorphan
2-[Furyl-methyl-(3'')]-2'-hydroxy-5-methyl-6,7-benzomorphan
2-[Furyl-methyl-(3'')]-2'-hydroxy-5-ethyl-6,7-benzomorphan
2-[Furyl-methyl-(3'')]-2'-hydroxy-5-n-propyl-6,7-benzomorphan
2-[Furyl-methyl-(3'')]-2'-hydroxy-5-isopropyl-6,7-benzomorphan
2-(3''-Methyl-furfuryl)-2'-hydroxy-5-methyl-6,7-benzomorphan
2-(3''-Methyl-furfuryl)-2'-hydroxy-5-ethyl-6,7-benzomorphan
2-(3''-Methyl-furfuryl)-2'-hydroxy-5-n-propyl-6,7-benzomorphan
2-(3''-Methyl-furfuryl)-2'-hydroxy-5-isopropyl-6,7-benzomorphan
2-(4''-Methyl-furfuryl)-2'-hydroxy-5-methyl-6,7-benzomorphan
2-(4''-Methyl-furfuryl)-2'-hydroxy-5-ethyl-6,7-benzomorphan
2-(4''-Methyl-furfuryl)-2'-hydroxy-5-n-propyl-6,7-benzomorphan
2-(4''-Methyl-furfuryl)-2'-hydroxy-5-isopropyl-6,7-benzomorphan
2-(5''-Methyl-furfuryl)-2'-hydroxy-5-methyl-6,7-benzomorphan
2-(5''-Methyl-furfuryl)-2'-hydroxy-5-ethyl-6,7-benzomorphan
2-(5''-Methyl-furfuryl)-2'-hydroxy-5-n-propyl-6,7-benzomorphan
2-(5''-Methyl-furfuryl)-2'-hydroxy-5-isopropyl-6,7-benzomorphan
2-(3''-Ethyl-furfuryl)-2'-hydroxy-5-methyl-6,7-benzomorphan
2-(3''-Ethyl-furfuryl)-2'-hydroxy-5-ethyl-6,7-benzomorphan
2-(3''-Ethyl-furfuryl)-2'-hydroxy-5-n-propyl-6,7-benzomorphan
2-(3''-Ethyl-furfuryl)-2'-hydroxy-5-isopropyl-6,7-benzomorphan
2-(4''-Ethyl-furfuryl)-2'-hydroxy-5-methyl-6,7-benzomorphan
2-(4''-Ethyl-furfuryl)-2'-hydroxy-5-ethyl-6,7-benzomorphan
2-(4''-Ethyl-furfuryl)-2'-hydroxy-5-n-propyl-6,7-benzomorphan
2-(4''-Ethyl-furfuryl)-2'-hydroxy-5-isopropyl-6,7-benzomorphan
2-(5''-Ethyl-furfuryl)-2'-hydroxy-5-methyl-6,7-benzomorphan
2-(5''-Ethyl-furfuryl)-2'-hydroxy-5-ethyl-6,7-benzomorphan
2-[2''-Methyl-furylmethyl-(3'')]-2'-hydroxy-5-methyl-6,7-benzomorphan
2-[2''-Methyl-furylmethyl-(3'')]-2'-hydroxy-5-ethyl-6,7-benzomorphan
2-[2''-Methyl-furylmethyl-(3'')]-2'-hydroxy-5-n-propyl-6,7-benzomorphan
2-[2''-Methyl-furylmethyl-(3'')]-2'-hydroxy-5-isopropyl-6,7-benzomorphan
2-[4''-Methyl-furylmethyl-(3'')]-2'-hydroxy-5-methyl-6,7-benzomorphan
2-[4''-Methyl-furylmethyl-(3'')]-2'-hydroxy-5-ethyl-6,7-benzomorphan
2-[4''-Methyl-furylmethyl-(3'')]-2'-hydroxy-5-n-propyl-6,7-benzomorphan
2-[4''-Methyl-furylmethyl-(3'')]-2''-hydroxy-5-isopropyl-6,7-benzomorphan
2-[5''-Methyl-furylmethyl-(3'')]-2'-hydroxy-5-methyl-6,7-benzomorphan
2-5''-Methyl-furylmethyl-(3'')]-2'-hydroxy-5-ethyl-6,7-benzomorphan
2-[5''-Methyl-furylmethyl-(3'')]-2'-hydroxy-5-n-propyl-6,7-benzomorphan
2-[5''-Methyl-furylmethyl-(3'')]-2'-hydroxy-5-isopropyl-6,7-benzomorphan
2-[2''-Ethyl-furylmethyl-(3'')]-2'-hydroxy-5-methyl-6,7-benzomorphan
2-[2''-Ethyl-furylmethyl-(3'')]-2'-hydroxy-5-ethyl-6,7-benzomorphan
2-[2''-Ethyl-furylmethyl-(3'')]-2'-hydroxy-5-n-propyl-6,7-benzomorphan
2-[2''-Ethyl-furylmethyl-(3'')]-2'-hydroxy-5-isopropyl-6,7-benzomorphan
2-[4''-Ethyl-furylmethyl-(3'')]-2'-hydroxy-5-methyl-6,7-benzomorphan
2-[4''-Ethyl-furylmethyl-(3'')]-2'-hydroxy-5-ethyl-6,7-benzomorphan
2-[4''-Ethyl-furylmethyl-(3'')]-2'-hydroxy-n-propyl-6,7-benzomorphan
2-[4''-Ethyl-furylmethyl-(3'')]-2'-hydroxy-isopropyl-6,7-benzomorphan
2-[5''-Ethyl-furylmethyl-(3'')]-2'-hydroxy-5-methyl-6,7-benzomorphan
2-[5''-Ethyl-furylmethyl-(3'')]-2'-hydroxy-5-ethyl-6,7-benzomorphan
2-[5''-Ethyl-furylmethyl-(3'')]-2'-hydroxy-5-n-propyl-6,7-benzomorphan
2-5'''-Ethyl-furylmethyl-(3'')]-2'-hydroxy-5-ispropyl-6,7-benzomorphan
2-[5'''-Methyl-furylmethyl-(3'')]-2''-hydroxy-5-methyl-6,7-benzomorphan
2-[5''-Methyl-furylmethyl-(3'')]-2'-hydroxy-5-ethyl-6,7-benzomorphan
2-[5''-Methyl-furylmethyl-(3'')]-2'-hydroxy-5-n-propyl-6,7-benzomorphan
2-[5''-Methyl-furylmethyl-(3'')]-2'-hydroxy-5-isopropyl-6,7-benzomorphan
2-Furfuryl-2'-hydroxy-6,7-benzomorphan
2-[Furylmethyl-(3'')]-2'-hydroxy-6,7-benzomorphan
2-[2''-Methyl-furylmethyl-(3'')]-2'-hydroxy-benzomorphan
2-(3''-Methyl-furfuryl)-2'-hydroxy-6,7-benzomorphan 2-Furfuryl-2'-methoxy-5-methyl-6,7-benzomorphan
2-Furfuryl-2'-methoxy-5-ethyl-6,7-benzomorphan
2-Furfuryl-2'-methoxy-5-n-propyl-6,7-benzomorphan
2-Furfuryl-2'-methoxy-5-isopropyl-6,7-benzomorphan
2-furfuryl-2'-acetoxy-5-methyl-6,7-benzomorphan
2-Furfuryl-2'-acetoxy-5-ethyl-6,7-benzomorphan
2-Furfuryl-2'-acetoxy-5-n-propyl-6,7-benzomorphan
2-Furfuryl-2'-acetoxy-5-isopropyl-6,7-benzomorphan The compounds embraced by formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, pivalic acid, caproic acid, oxalic acid, malonic acid, succinic acid, maleic acid, fumaric acid, lactic acid, tartaric acid, citric acid, malic acid, benzoic acid, phthalic acid, cinnamic acid salicylic acid, ascorbic acid, 8-chlorotheophylline, methanesulfonic acid or the like.

The following examples illustrate the preparation of various compounds of the formula I and non-toxic, pharmacologically acceptable acid addition salts thereof.

EXAMPLE 1

2-Furfuryl-2'-hydroxy-α-5,9-dimethyl-6,7-benzomorphan and its methanesulfonate by method A a. A mixture consisting of 21.7 gm (0.1 mol) of racemic 2'-hydroxy-α-5,9-dimethyl-6,7-benzomorphan, 12.6 gm (0.15 mol) of sodium bicarbonate, 12.8 gm (0.11 mol) of furfuryl chloride, 60 ml of dimethylformamide and 100 ml of tetrahydrofuran was refluxed for three hours, accompanied by stirring. Thereafter, the reaction solution was evaporated in vacuo, the residue was shaken with a mixture of chloroform and water, and the chloroform phase was separated, washed twice with water, dried with sodium sulfate and evaporated. The residue was admixed with 100 ml of hot benzene, and the mixture was allowed to cool, whereby crystallization spontaneously ensued; the mixture was continuously stirred throughout the crystallization and until it had cooled to room temperature, and was then allowed to stand overnight in a refrigerator. Thereafter, the crystalline substance was collected by vacuum filtration and then washed first with benzene and subsequently with petroleum ether. The filter cake was allowed to dry in the air to yield a crystalline substance having a melting point of 104°–106°C. and comprising 1 mol of benzene of crystallization; subsequent drying of this crystalline product at 80°C. until the weight remained constant yielded 50 gm (84% of theory) of the solvent-free, crystalline, racemic free base of the formula

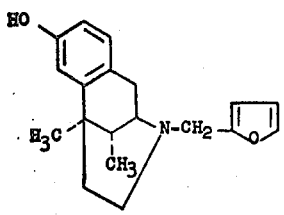

having a melting point of 121–122°C.

b. The free base was suspended in 50 ml of absolute ethanol, and the suspension was just barely acidified by the addition of an ethanolic 2M solution of methanesulfonic acid, whereby a solution was formed. The resulting solution was admixed with absolute ether until it remained turbid, and then it was inoculated with crystals, whereupon crystallization ensued. The mixture was then stirred for about two hours, an equal amount of ether was added thereto, and it was stirred for two hours more. Subsequently, the mixture was allowed to stand overnight in a refrigerator, the crystalline substance was collected by vacuum filtration, and the filter cake was washed first with ethanol/ether and then with ether. The product was dried first in the air and then at 80°C., yielding 35.5 gm (90.5% of theory) of the methanesulfonate of 2-furfuryl-2'-hydroxy-α-5,9-dimethyl-6,7-benzomorphan, m.p. 162°–164°C. A sample recrystallized from ethanol/ether had a melting point of 163°–165°C.

EXAMPLE 2

Using a procedure analogous to that described in Example 1(a), 74% of theory of (-)-2-furfuryl-2'-hydroxy-α-5,9-dimethyl-6,7-benzomorphan, m.p. 135°C., specific rotation $[\alpha]_D^{25} = -129°$ (c = 1 gm/100 ml methanol), was obtained from optically active (-)-2'-hydroxy-α-5,9-dimethyl-6,7-benzomorphan and furfuryl chloride.

Analogously, when (+)-2'-hydroxy-α-5,9-dimethyl-6,7-benzomorphan was used as the starting compound, the end product was (+)-2-furfuryl-2'-hydroxy-α-5,9-dimethyl-6,7-benzomorphan, specific rotation $[\alpha]_D^{25} = +128°$ (c = 1, methanol).

EXAMPLE 3

2-[Furylmethyl-(3″)]-2'-hydroxy-α-5-ethyl-9-methyl-6,7-benzomorphan and its hydrochloride by method A A mixture consisting of 2.31 gm (0.01 mol) of 2'-hydroxy-α-5-ethyl-9-methyl-6,7-benzomorphan, 1.26 gm (0.015 mol) of sodium bicarbonate, 1.28 gm (0.011 mol) of 3-chloromethyl-furan, 15 ml of dimethylformamide and 25 ml of tetrahydrofuran was refluxed for four hours, accompanied by stirring. Thereafter, the reaction solution was evaporated in vacuo, and the residue was shaken with a mixture of chloroform and water. The chloroform phase was separated, washed twice with water, dried with sodium sulfate and evaporated. The residue, raw 2-[furylmethyl-(3″)]-2'-hydroxy-α-5-ethyl-9-methyl-6,7-benzomorphan, was dissolved in 10–20 ml of absolute ethanol, the resulting solution was made just acid with ethanolic 5N hydrochloric acid, and the acidic solution was admixed with absolute ether until it remained turbid. The mixture was allowed to stand overnight in a refrigerator, the crystalline substance which had separated out during that time was collected by vacuum filtration, washed first with ethanol/ether and then with absolute ether, and dried in the air and then at 80°C., yielding 3.0 gm (96.5% of theory) of the compound of the formula

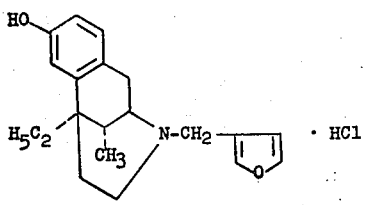

having a melting point of 268°C., which did not change after recrystallization from ethanol/ether.

EXAMPLE 4

Using a procedure analogous to that described in Example 1(a), 2-furfuryl-2'-hydroxy-α-5-methyl-9-ethyl-6,7-benzomorphan was prepared from 2'-hydroxy-α-5-methyl-9-ethyl-6,7-benzomorphan and furfuryl chloride.

Its methanesulfonate, m.p. 156°–157°C., was obtained with a yield of 55% of theory by the procedure described in Example 1(b).

EXAMPLE 5

Using a procedure analogous to that described in Example 1(a), 2-furfuryl-2'-hydroxy-α-5-ethyl-9-methyl-6,7-benzomorphan was prepared from 2'-hydroxy-α-5-ethyl-9-methyl-6,7-benzomorphan and furfuryl chloride.

Its hydrochloride, m.p. 254°C., was obtained with a yield of 87% of theory by substituting hydrochloric acid for methanesulfonic acid in the procedure described in Example 1(b).

EXAMPLE 6

Using a procedure analogous to that described in Example 1(a), 2-furfuryl-2'-hydroxy-α-5,9-diethyl-6,7-benzomorphan was prepared from 2'-hydroxy-α-5,9-diethyl-6,7-benzomorphan and furfuryl chloride.

Its hydrochloride, m. p. 236°C., was obtained with a yield of 72% of theory by substituted hydrochloric acid for methansulfonic acid in the procedure described in Example 1(b).

EXAMPLE 7

Using a procedure analogous to that described in Example 1(a), 2-[furylmethyl-(3″-]-2-hydroxy-α-5,9-dimethyl-6,7-benzomorphan was prepared from 2'-hydroxy-α-5,9-dimethyl-6,7-benzomorphan and 3-chloromethyl-furan.

Its hydrochloride, m. p. 252°C., was obtained with a yield of 78% of theory by substituting hydrochloric acid for methanesulfonic acid in the procedure described in Example 1(b).

EXAMPLE 8

Using a procedure analogous to that described in Example 1(a), 81% of theory of 2-[furylmethyl-(3″)]-2'-hydroxy-α-5-methyl-9-ethyl-6,7-benzomorphan, m. p. 268°C., was obtained from 2'-hydroxy-α-5-methyl-9-ethyl-6,7-benzomorphan and 3-chloromethyl-furan.

EXAMPLE 9

Using a procedure analogous to that described in Example 1(a), 2-[furylmethyl-(3″)]-2'-hydroxy-α-5,9-diethyl-6,7-benzomorphan was prepared from 2'-hydroxy-α-5,9-diethyl-6,7-benzomorphan and 3-chloromethyl-furan.

Its hydrochloride, m. p. 278°C., was obtained with a yield of 80% of theory by substituting hydrochloric acid for methanesulfonic acid in the procedure described in Example 1(b).

EXAMPLE 10

Using a procedure analogous to that described in Example 1(a), 2-[2″-methyl-furylmethyl-(3″)]-2'-hydroxy-α-5,9-dimethyl-6,7-benzomorphan was prepared from 2'-hydroxy-α-5,9-dimethyl-6,7-benzomorphan and 2-methyl-3-chloromethylfuran.

Its hydrochloride, m. p. 270°C., was obtained with a yield of 86% of theory by substituting hydrochloric acid for methanesulfonic acid in the procedure described in Example 1(b).

EXAMPLE 11

Using a procedure analogous to that described in Example 1(a), 2-[2″-methyl-furylmethyl-(3″)]-2'-hydroxy-α-5-methyl-9-ethyl-6,7-benzomorphan was prepared from 2'-hydroxy-α-5-methyl-9-ethyl-6,7-benzomorphan and 2-methyl-3-chloromethyl-furan.

Its hydrochloride, m. p. 261°C., was obtained with a yield of 89% of theory by substituting hydrochloric acid for methanesulfonic acid in the procedure described in Example 1(b).

EXAMPLE 12

Using a procedure analogous to that described in Example 1(a), 2-[2″-methyl-furylmethyl-(3″)]-2'-hydroxy-α-5-ethyl-9-methyl-6,7-benzomorphan was prepared from 2'-hydroxy-α-5-ethyl-9-methyl-6,7-benzomorphan and 2-methyl-3-chloromethyl-furan.

Its hydrochloride, m. p. 300°C., was obtained with a yield of 97% of theory by substituting hydrochloric acid for methanesulfonic acid in the procedure described in Example 1(b).

EXAMPLE 13

Using a procedure analogous to that described in Example 1(a), 71% of theory of 2-[2″-methyl-furylmethyl-(3″)]-2'-hydroxy-α-5,9-diethyl-6,7-benzomorphan, m.p. 216°C., was obtained from 2'-hydroxy-α-5,9-diethyl-6,7-benzomorphan and 2-methyl-3-chloromethyl-furan.

EXAMPLE 14

Using a procedure analogous to that described in Example 1(a), 2-[2″-ethyl-furylmethyl-(3″)]-2'-hydroxy-α-5,9-dimethyl-6,7-benzomorphan was prepared from 2'-hydroxy-α-5,9-dimethyl-6,7-benzomorphan and 2-ethyl-3-chloromethyl-furan.

Its hydrochloride, m. p. 133°–134°C., was obtained with a yield of 94% of theory by substituting hydrochloric acid for methanesulfonic acid in the procedure described in Example 1(b).

EXAMPLE 15

Using a procedure analogous to that described in Example 1(a), 2-[2″-ethyl-furylmethyl-(3″)]-2'-hydroxy-α-5-methyl-9-ethyl-6,7-benzomorphan was prepared from 2'-hydroxy-α-5-methyl-9-ethyl-6,7-benzomorphan and 2-ethyl-3-chloromethyl-furan.

Its hydrochloride, m. p. 285°C., was obtained with a yield of 79% of theory by substituting hydrochloric acid for methanesulfonic acid in the procedure described in Example 1(b).

EXAMPLE 16

Using a procedure analogous to that described in Example 1(a), 2-[3″-ethyl-furylmethyl-(3″)]-2′-hydroxy-α-5-ethyl-9-methyl-6,7-benzomorphan was prepared from 2′-hydroxy-α-5-ethyl-9-methyl-6,7-benzomorphan and 2-ethyl-3-chloromethyl-furan.

Its hydrochloride, m. p. 165°–170°C., was obtained with a yield of 95% of theory by substituting hydrochloric acid for methanesulfonic acid in the procedure described in Example 1(b).

EXAMPLE 17

Using a procedure analogous to that described in Example 1(a), 2-[2″-ethyl-furylmethyl-(3″)]-2′-hydroxy-α-5,9-diethyl-6,7-benzomorphan was prepared from 2′-hydroxy-α-5,9-diethyl-6,7-benzomorphan and 2-ethyl-3-chloromethyl-furan.

Its hydrochloride, m. p. 265°–266°C., was obtained with a yield of 87% of theory by substituting hydrochloric acid for methanesulfonic acid in the procedure described in Example 1(b).

EXAMPLE 18

Using a procedure analogous to that described in Example 1(a), 2-furfuryl-2′-methoxy-α-5,9-dimethyl-6,7-benzomorphan was prepared from 2′-methoxy-α-5,9-dimethyl-6,7-benzomorphan and furfuryl chloride.

Its hydrochloride, m. p. 210°C., was obtained by substituting hydrochloric acid for methanesulfonic acid in the procedure described in Example 1(b).

EXAMPLE 19

Using a procedure analogous to that described in Example 1(a), 2-furfuryl-2′-acetoxy-α-5,9-dimethyl-6,7-benzomorphan was prepared from 2′-acetoxy-α-5,9-dimethyl-6,7-benzomorphan and furfuryl chloride.

Its hydrochloride, m. p.. 134°–135°C., was obtained by substituting hydrochloric acid for methanesulfonic acid in the procedure described in Example 1(b).

EXAMPLE 20

2-(5″-Methyl-furfuryl)-2′-hydroxy-α-5,9-dimethyl-6,7-benzomorphan and its hydrochloride by method B a. 2.17 gm (0.01 mol) of 2′-hydroxy-α-5,9-dimethyl-6,7-benzomorphan and 1.0 gm of an aqueous 30% formaldehyde solution (0.01 mol CH₂O) were successively dissolved in 10 ml of aqueous 50% acetic acid. While stirring, the resulting solution was admixed with 0.82 gm (0.01 mol) of 2-methyl-furan, and the mixture was stirred for 15 hours more. Thereafter, while adding ice, the solution was made alkaline with concentrated ammonia, the precipitate formed thereby was extracted with chloroform, and the organic extract solution was washed with water, dried with sodium sulfate and evaporated. For purification, the evaporation residue was dissolved in 50 ml of commercial chloroform, and the solution was chromatographed through a column charged with 75 gm of aluminum oxide (neutral, activity stage III). The first 200 to 250 ml of the eluate were collected and evaporated, yielding as a residue pure 2-(5″-methyl-furfuryl)-2′-hydroxy-α-5,9-dimethyl-6,7-benzomorphan.

b. The residue was dissolved in 10 to 20 ml of ethanol, the resulting solution was acidified with ethanolic 5N hydrochloric acid, the acidic solution was admixed with absolute ether until it remained turbid, and the mixture was allowed to stand overnight in a refrigerator. Thereafter, the precipitate which had formed was collected by vacuum filtration and dried first in the air and then at 80°C., yielding 2.1 gm (63% of theory) of the compound of the formula

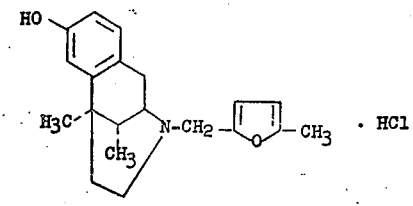

having a melting point of 232°C. Upon recrystallization from ethanol/ether, the melting point of the hydrochloride did not change.

EXAMPLE 21

Using a procedure analogous to that described in Example 20, 2-(5″-ethyl-furfuryl)-2′-hydroxy-α-5-methyl-9-ethyl-6,7-benzomorphan was prepared from 2′-hydroxy-α-5-methyl-9-ethyl-6,7-benzomorphan, aqueous formaldehyde and 2-ethyl-furan.

Its hydrochloride, m. p. 192°C., was obtained with a yield of 64% of theory.

EXAMPLE 22

Using a procedure analogous to that described in Example 20, 2-(5″-methyl-furfuryl)-2′-hydroxy-α-5-methyl-9-ethyl-6,7-benzomorphan, m. p. 169°C., was obtained from 2′-hydroxy-α-5-methyl-9-ethyl-6,7-benzomorphan, aqueous formaldehyde and 2-methyl-furan with a yield of 52% of theory.

EXAMPLE 23

Using a procedure analogous to that described in Example 20, 2-(5″-methyl-furfuryl)-2′-hydroxy-α-5-ethyl-9-methyl-6,7-benzomorphan was prepared from 2′-hydroxy-α-5-ethyl-9-methyl-6,7-benzomorphan, aqueous formaldehyde and 2-methyl-furan.

Its hydrochloride, m. p. 140°C., was obtained with a yield of 83% of theory.

EXAMPLE 24

Using a procedure analogous to that described in Example 20, 2-(5″-methyl-furfuryl)-2′-hydroxy-α-5,9-diethyl-6,7-benzomorphan, m. p. 147°C., was obtained from 2′-hydroxy-α-5,9-diethyl-6,7-benzomorphan, aqueous formaldehyde and 2-methyl-furan with a yield of 47% of theory.

EXAMPLE 25

Using a procedure analogous to that described in Example 20, 2-(5″-ethyl-furfuryl)-2′-hydroxy-α-5,9-dimethyl-6,7-benzomorphan, m. p. 151°C., was obtained from 2′-hydroxy-α-5,9-dimethyl-6,7-benzomorphan, aqueous formaldehyde and 2-ethyl-furan with a yield of 71% of theory.

EXAMPLE 26

Using a procedure analogous to that described in Example 20, 2-(5''-ethyl-furfuryl)-2'-hydroxy-α-5-ethyl-9-methyl-6,7-benzomorphan, m. p. 172°C., was obtained from 2'-hydroxy-α-5-ethyl-9-methyl-6,7-benzomorphan, aqueous formaldehyde and 2-ethyl-furan with a yield of 86% of theory.

EXAMPLE 27

Using a procedure analogous to that described in Example 20, 2-(5''-ethyl-furfuryl)-2'-hydroxy-α-5,9-diethyl-6,7-benzomorphan, m. p. 161°C., was obtained from 2'-hydroxy-α-5,9-diethyl-6,7-benzomorphan, aqueous formaldehyde and 2-ethyl-furan with a yield of 48% of theory.

EXAMPLE 28

Using a procedure analogous to that described in Example 20, 2-[2''-methyl-furylmethyl-(3'')]-2'-methoxy-α-5,9-dimethyl-6,7-benzomorphan was prepared from 2'-methoxy-α-5,9-dimethyl-6,7-benzomorphan, aqueous formaldehyde and 2-methyl-furan.

Its hydrochloride, m. p. 128°C., was obtained with a yield of 63% of theory.

EXAMPLE 29

Using a procedure analogous to that described in Example 20, 2-[2''-methyl-furylmethyl-(3'')]-2'-acetoxy-α-5,9-dimethyl-6,7-benzomorphan was prepared from 2'-acetoxy-α-5,9-dimethyl-6,7-benzomorphan, aqueous formaldehyde and 2-methyl-furan.

Its hydrochloride, m. p. 212°–215°C., was obtained with a yield of 56% of theory.

EXAMPLE 30

2-(3''-Methyl-furfuryl)-2'-hydroxy-α-5,9-diethyl-6,7-benzomorphan by method D 2.45 gm (0.01 mol) of 2'-hydroxy-α-5,9-diethyl-6,7-benzomorphan were dissolved in 35 ml of warm methanol, and, while stirring, the resulting solution was admixed with a solution of 2.5 gm of potassium carbonate in 4 ml of water. The mixed solution was allowed to cool to 20°C., and then 1.74 gm (0.011 mol) of 3-methyl-furan-2-carboxylic acid chloride were added over a period of ten minutes, and the resulting mixture was vigorously stirred for five hours. Thereafter, the methanol was removed by evaporation, the residue was shaken with a mixture of chloroform and water, the chloroform phase was separated, washed once with 2N hydrochloric acid and then twice with water, dried with sodium sulfate, and the chloroform was removed by evaporation. In order to remove residual traces of chloroform, the residue was redissolved in benzene, and the solution was again evaporated.

The residue, which consisted mainly of 2-[3''-methyl-furoyl-(2'')]-2'-hydroxy-α-5,9-diethyl-6,7-benzomorphan and contained a small amount of 2-(3''-methyl-2''-furoyl)-2'-(3''-methyl-2''-furoyloxy)-α-5,9-diethyl-6,7-benzomorphan (the pure major component had a melting point of 87°–89°C. after crystallization from benzene), was dissolved in 50 ml of absolute tetrahydrofuran, and the resulting solution was added dropwise to a suspension of 0.76 gm (0.02 mol) of lithium aluminum hydride in 25 ml of tetrahydrofuran at 5°–10°C., accompanied by stirring. The resulting mixture was stirred overnight at room temperature, and then, while cooling it on an ice bath and vigorously stirring, 1.5 ml of water were added dropwise, and then 75 ml of a saturated aqueous diammonium tartrate solution were added. The resulting mixture was stirred for one hour and subsequently allowed to separate by standing in a separating funnel. The (upper) tetrahydrofuran phase was separated and evaporated, and the aqueous phase was extracted three times with 25 ml of chloroform each. The residue of the evaporated tetrahydrofuran phase was dissolved in the combined chloroform extracts, and the resulting solution was washed with water, dried with sodium sulfate and evaporated in vacuo. The residue was crystallized from methanol to yield 2.2 gm of the reaction product with a melting point of 195°C. Recrystallization from aqueous methanol yielded 1.6 gm (47% of theory) of the pure compound of the formula

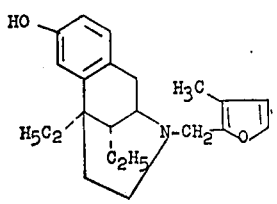

having a melting point of 201°C., which did not change upon further recrystallization.

EXAMPLE 31

2-Furfuryl-2'-hydroxy-α-5,9-dimethyl-6,7-benzomorphan by method D a. N,O-Di-(2''-furoyl)-2'-hydroxy-α-5,9-dimethyl-6,7-benzomorphan A solution of 28.7 gm (0.22 mol) of furan-2-carboxylic acid chloride in 109 ml of absolute methylene chloride was added dropwise over a period of about one hour to a suspension of 21.7 gm (0.1 mol) of 2'-hydroxy-α-5,9-dimethyl-6,7-benzomorphan in a mixture of 217 ml of absolute methylene chloride and 40 ml of triethylamine, accompanied by stirring, and the resulting mixture was refluxed for four hours. Thereafter, the reaction solution was allowed to cool and was then washed in the presence of ice, first twice with 100 ml of 2N hydrochloric acid each and subsequently three times with water. The methylene chloride phase was dried with sodium sulfate and then evaporated in vacuo, and the residue was caused to crystallize by digesting it with 250 ml of hot ethanol. The ethanolic mixture was stirred until it had cooled and was then allowed to stand overnight in a refrigerator. The crystalline substance was collected by vacuum filtration, washed with absolute ether and dried at 80°C., yielding 38.5 gm (95% of theory) of N,O-di-(2''-furoyl)-2'-hydroxy-α-5,9-dimethyl-6,7-benzomorphan, m. p. 176°–177°C. A sample, recrystallized from ethanol, had a melting point of 177°–178°C.

b. 2-Furfuryl-2'-hydroxy-α-5,9-dimethyl-6,7-benzomorphan 38.5 gm (0.095 mol) of N,O-di-(2''-furoyl)-2'-hydroxy-α-5,9-dimethyl-6,7-benzomorphan was dissolved in 770 ml of absolute tetrahydrofuran, and, while stirring and cooling, the solution was added dropwise to a suspension of 7.6 gm (0.2 mol) of lithium aluminum hydride in 200 ml of tetrahydrofuran. Thereafter, the mixture was stirred overnight at room temperature, and then, while cooling it on an ice bath and vigorously stirring it, 15 ml of water were added dropwise and subsequently 750 ml of a saturated aqueous diammonium tartrate solution. The resulting mixture was stirred for one hour more and was then worked up as described in Example 30. The residue from the evaporation of the chloroform solution was digested with 100 ml of hot benzene, and the mixture was stirred while crystallization occurred and until it had cooled. The cool mixture was allowed to stand in a refrigerator overnight, and then the crystalline substance was collected by vacuum filtration, washed first with benzene and then with petroleum ether, and dried first in the air and then in a drying chamber at 80°C. until its weight remained constant. 27 gm (96% of theory) of the reaction product having a melting point of 121°–122°C. were obtained. It was identical to the end product of Example 1(a).

EXAMPLE 32

Using a procedure analogous to that described in Example 31, 71% of theory of 2-(3''-methyl-furfuryl)-2'-hydroxy-α-5,9-dimethyl-6,7-benzomorphan, m. p. 119°C., was obtained by reacting 2'-hydroxy-α-5,9-dimethyl-6,7-benzomorphan with 3-methyl-furan-2-carboxylic acid chloride, and reducing the N,O-di-[3''-methyl-furoyl-(2'')]-α-5,9-dimethyl-6,7-benzomorphan formed thereby with lithium aluminum hydride.

EXAMPLE 33

Using a procedure analogous to that described in Example 31, 57% of theory of 2-(3''-methyl-furfuryl)-2'-hydroxy-α-5-methyl-9-ethyl-6,7-benzomorphan, m.p. 177°C, was obtained by reacting 2'-hydroxy-α-5-methyl-9-ethyl-6,7-benzomorphan with 3-methyl-furan-2-carboxylic acid chloride, and reducing the N,O-di-[3''-methyl-furoyl-(2'')]-α-5-methyl-9-ethyl-6,7-benzomorphan formed thereby with lithium aluminum hydride.

EXAMPLE 34

Using a procedure analogous to that described in Example 31, 92% of theory of 2-(3''-methyl-furfuryl)-2'-hydroxy-α-5-ethyl-9-methyl-6,7-benzomorphan, m.p. 178°C, was obtained by reacting 2'-hydroxy-α-5-ethyl-9-methyl-6,7-benzomorphan with 3-methyl-furan-2-carboxylic acid chloride, and reducing the N,O-di-[3''-methyl-furoyl-(2'')]-α-5-ethyl-9-methyl-6,7-benzomorphan formed thereby with lithium aluminum hydride.

EXAMPLE 35

Using a procedure analogous to that described in Example 30, 58% of theory of 2-(4''-methyl-furfuryl)-2'-hydroxy-α-5,9-dimethyl-6,7-benzomorphan, m.p. 144°–146°C, was obtained by reacting 2'-hydroxy-α-5,9-dimethyl-6,7-benzomorphan with 4-methyl-furan-2-carboxylic acid chloride, and reducing the N,O-di-[4''-methyl-furoyl-(2'')]-α-5,9-dimethyl-6,7-benzomorphan formed thereby with lithium aluminum hydride.

EXAMPLE 36

Using a procedure analogous to that described in Example 30, 67% of theory of 2-[4''-methyl-furylmethyl-(3'')]-2'-hydroxy-α-5,9-dimethyl-6,7-benzomorphan, m.p. 250°C, was obtained by reacting 2'-hydroxy-α-5,9-dimethyl-6,7-benzomorphan with 4-methyl-furan-3-carboxylic acid chloride, and reducing the N,O-di-[4''-methyl-furoyl-(3'')]-α-5,9-dimethyl-6,7-benzomorphan formed whereby with lithium aluminum hydride.

EXAMPLE 37

Using a procedure analogous to that described in Example 30, 83% of theory of 2-[5''-methyl-furylmethyl-(3'')]-2'-hydroxy-α-5,9-dimethyl-6,7-benzomorphan, m.p. 248°C, was obtained by reacting 2'-hydroxy-α-5,9-dimethyl-6,7-benzomorphan with 5-methyl-furan-3-carboxylic acid chloride, and reducing the N,O-di-[5''-methyl-furoyl-(3'')]-α-5,9-dimethyl-6,7-benzomorphan formed thereby with lithium aluminum hydride.

EXAMPLE 38

2-Furfuryl-2'-hydroxy-5-ethyl-6,7-benzomorphan and its hydrochloride by method A A mixture consisting of 2.17 gm (0.01 mol) of 2'-hydroxy-5-ethyl-6,7-benzomorphan, 1.26 gm (0.015 mol) of sodium bicarbonate, 1.28 gm (0.011 mol) of furfuryl chloride, 6 ml of dimethylformamide and 10 ml of tetrahydrofuran was refluxed for three hours. Thereafter, the reaction solution was evaporated in vacuo, and the residue was shaken with a mixture of chloroform and water. The chloroform phase was separated, washed twice with water, dried with sodium sulfate and evaporated in vacuo. The residue, 2-furfuryl-2'-hydroxy-5-ethyl-6,7-benzomorphan, was dissolved in 10–20 ml of absolute methanol, the resulting solution was made just acid with ethanolic 5N hydrochloric acid, absolute ether was added to the acidic solution until it became turbid, and the mixture was allowed to stand overnight in a refrigerator. Thereafter, the crystalline precipitate which had formed was collected by vacuum filtration, washed once with ethanol/ether and once with absolute ether, and then dried first in the air and subsequently at 80°C., yielding 2.7 gm (79.5% of theory) of the compound of the formula

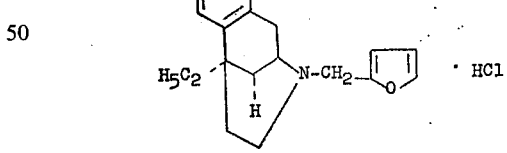

having a melting point of 242°C. which did not change upon further recrystallization from ethanol/ether.

EXAMPLE 39

2-[2''-Methyl-furylmethyl-(3'')]-2'-hydroxy-5-n-propyl-6,7-benzomorphan by method A A mixture consisting of 2.3 gm (0.01 mol) of 2'-hydroxy-5-n-propyl-6,7-benzomorphan, 1.26 gm (0.015 mol) of sodium bicarbonate, 1.42 gm (0.011 mol) of 2-methyl-3-chloromethyl-furan, 6 ml of dimethylformamide and 10 ml of tetrahydrofuran was refluxed for four hours, accompanied by stirring. Thereafter, the reaction solution was evaporated in vacuo, the residue was shaken with a mixture of chloroform and water, and the chloroform phase was separated, washed twice with water, dried with sodium sulfate and evaporated in vacuo. The residue was crystallized from a mixture of 70 ml of acetone and 10 ml of water, yielding 2.4 gm (73.5% of theory) of the compound of the formula

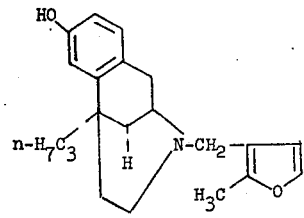

having a melting point of 159°–160°C. Recrystallization from acetone/water raised the melting point to 160°–161°C.

EXAMPLE 40

2-Furfuryl-2'-hydroxy-5-isopropyl-6,7-benzomorphan by method A a. N-Methyl-2'-hydroxy-5-isopropyl-6,7-benzomorphan was demethylated with phosgene in toluene, the unreacted N-methyl starting compound was separated, and the intermediate product was isolated and hydrolized with dilute hydrochloric acid to form the N-nor compound (yield: 48% of theory).

b. A mixture consisting of 2.3 gm (0.01 mol) of 2'-hydroxy-5-isopropyl-6,7-benzomorphan, 1.28 gm (0.011 mol) of furfuryl chloride, 1.26 gm (0.015 mol) of sodium bicarbonate, and 45 ml of a mixture of tetrahydrofuran and dimethylformamide (2:1) was refluxed for three hours. Thereafter, the reaction solution was evaporated in a rotary evaporator, the residue was taken up in chloroform, and the resulting solution was extracted several times with water, dried with sodium sulfate and evaporated in vacuo. The residue was chromatographed on an aluminum oxide (basic, activity stage III) column with chloroform containing 1% methanol as the solvent. The eluate was evaporated in vacuo, and the residue was recrystallized from methanol, yielding 0.5 gm (16% of theory) of the compound of the formula

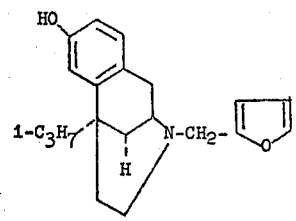

having a melting point of 173°–176°C.

EXAMPLE 41

Using a procedure analogous to that described in Example 38, 56.5% of theory of 2-furfuryl-2'-hydroxy-5-methyl-6,7-benzomorphan, m.p. 188°C, was obtained from 2'-hydroxy-5-methyl-6,7-benzomorphan and furfuryl chloride.

EXAMPLE 42

Using a procedure analogous to that described in Example 38, 74.5% of theory of 2-[furyl-methyl-(3″)]-2'-hydroxy-5-methyl-6,7-benzomorphan, m.p. 179°C, was obtained from 2'-hydroxy-5-methyl-6,7-benzomorphan and 3-chloromethylfuran.

EXAMPLE 43

Using a procedure analogous to that described in Example 38, 75% of theory of 2-[furyl-methyl-(3″)]-2'-hydroxy-5-ethyl-6,7-benzomorphan hydrochloride, m.p. 225°C, was obtained from 2'-hydroxy-5-ethyl-6,7-benzomorphan and 3-chloromethyl-furan.

EXAMPLE 44

Using a procedure analogous to that described in Example 38, 61% of theory of 2-[furyl-methyl-(3″)]-2'-hydroxy-5-n-propyl-6,7-benzomorphan, m.p. 182°C, was prepared from 2'-hydroxy-5-n-propyl-6,7-benzomorphan and 3-chloromethylfuran.

EXAMPLE 45

Using a procedure analogous to that described in Example 38, 81% of theory of 2-[2″-methyl-furylmethyl-(3″)]-2'-hydroxy-5-methyl-6,7-benzomorphan hydrochloride, m.p. 218°C, was obtained from 2'-hydroxy-5-methyl-6,7-benzomorphan and 2-methyl-3-chloromethyl-furan.

EXAMPLE 46

Using a procedure analogous to that described in Example 38, 89% of theory of 2-[2″-methyl-furylmethyl-(3″)]-2'-hydroxy-5-ethyl-6,7-benzomorphan hydrochloride, m.p. 253°C, was obtained from 2'-hydroxy-5-ethyl-6,7-benzomorphan and 2-methyl-3-chloromethyl-furan.

EXAMPLE 47

Using a procedure analogous to that described in Example 38, 74.5% of theory of 2-[2″-ethyl-furylmethyl-(3″)]-2'-hydroxy-5-ethyl-6,7-benzomorphan hydrochloride, m.p. 265°C, was obtained from 2'-hydroxy-5-ethyl-6,7-benzomorphan and 2-ethyl-3-chloromethyl-furan.

EXAMPLE 48

Using a procedure analogous to that described in Example 38, (-)-2-furfuryl-2'-hydroxy-5-methyl-6,7-benzomorphan, was prepared from (-)-2'-hydroxy-5-methyl-6,7-benzomorphan and furfuryl chloride.

EXAMPLE 49

Using a procedure analogous to that described in Example 38, (+)-2-furfuryl-2'-hydroxy-5-methyl-6,7-benzomorphan, was prepared from (+)-2'-hydroxy-5-methyl-6,7-benzomorphan and furfuryl chloride.

EXAMPLE 50

Using a procedure analogous to that described in Example 38, 2-furfuryl-2'-acetoxy-5-ethyl-6,7-benzomorphan hydrochloride, m.p. 222°–223°C, was prepared from 2'-acetoxy-5-ethyl-6,7-benzomorphan and furfuryl chloride.

EXAMPLE 51

Using a procedure analogous to that described in Example 38, 2-furfuryl-2'-methoxy-5-ethyl-6,7-benzomorphan hydrochloride, m.p. 202°C, was prepared from 2'-methoxy-5-ethyl-6,7-benzomorphan and furfuryl chloride.

EXAMPLE 52

Using a procedure analogous to that described in Example 38, 2-[2''-methyl-furylmethyl-(3'')]-2'-methoxy-5-n-propyl-6,7-benzomorphan was prepared from 2'-methoxy-5-n-propyl-6,7-benzomorphan and 2-methyl-3-chloromethyl furan.

EXAMPLE 53

Using a procedure analogous to that described in Example 38, 2-furfuryl-2'-methoxy-5-isopropyl-6,7-benzomorphan was prepared from 2'-methoxy-5-isopropyl-6,7-benzomorphan and furfuryl chloride.

EXAMPLE 54

Using a procedure analogous to that described in Example 38, 2-furfuryl-2'-acetoxy-5-n-propyl-6,7-benzomorphan was prepared from 2'-acetoxy-5-n-propyl-6,7-benzomorphan and furfuryl chloride.

EXAMPLE 55

2(5''-Methyl-furfuryl)-2'-hydroxy-5-ethyl-6,7-benzomorphan and its hydrochloride by method A a. Using a procedure analogous to that described in Example 1(a), 2-(5''-formyl-furfuryl)-2'-hydroxy-5-ethyl-6,7-benzomorphan was prepared from 2'-hydroxy-5-ethyl-6,7-benzomorphan and 5-formyl-furfuryl chloride.

b. A mixture consisting of 3.0 gm (0.01 mol) of 2-(5''-formyl-furfuryl)-2'-hydroxy-5-ethyl-6,7-benzomorphan, 5.0 gm of an 85% hydrazine hydrate solution, 2.3 gm of finely pulverized potassium hydroxide and 20 ml of triethyleneglycol was refluxed until the evolution of nitrogen had subsided (about 1.5 hours). Thereafter, the reaction mixture was diluted with 400 ml of water, ammonium chloride was added, and the mixture was extracted several times with chloroform. The combined chloroform extract solutions were washed with water, dried with sodium sulfate and evaporated, and the residue was purified by column chromatography on silicagel (200 gm; solvent system: Chloroform/methanol/concentrated ammonia 90: 10:0.5). The fractions containing the pure reaction product were combined and evaporated, and the residue, 2-(5''-methylfurfuryl)-2'-hydroxy-5-ethyl-6,7-benzomorphan, was converted in conventional manner into its hydrochloride, yielding 1.1 gm (32% of theory) of the compound of the formula

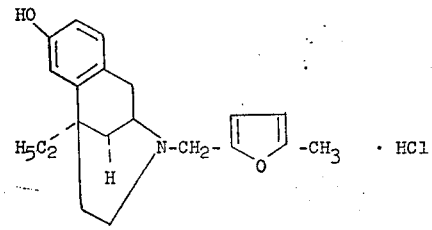

having a melting point of 230°–231°C.

EXAMPLE 56

2-(5''-Methyl-furfuryl)-2'-hydroxy-5-methyl-6,7-benzomorphan and its hydrochloride by method B a. A mixture consisting of 2.1 gm (0.01 mol) of 2'-hydroxy-5-methyl-6,7-benzomorphan, 1.1 gm of 30% formalin (0.011 mol formaldehyde), 0.9 gm (0.011 mol) of 2-methylfuran and 10 ml of aqueous 50% acetic acid was stirred at room temperature for 15 hours. Thereafter, the reaction solution was evaporated in vacuo, the residue was shaken with water, chlorform and ammonia (to alkaline reaction), the chloroform phase was separated, washed with water, dried with sodium sulfate and evaporated in vacuo, and the residue was crystallized from 20 ml of methanol, yielding 1.8 gm (60.5% of theory) of the free base of the formula

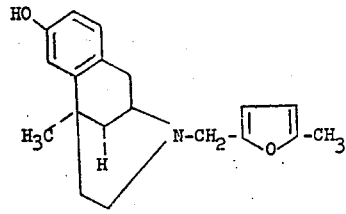

having a melting point of 191°C.

b. The free base was dissolved in 15 ml of absolute ethanol while adding 1.3 ml of ethanolic hydrochloric acid thereto, and the resulting solution was admixed with absolute ether until it became turbid and was then allowed to stand overnight in a refrigerator. Thereafter, the crystalline substance which had separated out was collected by vacuum filtration, washed with ethanol/ether, and dried first in the air and then at 80°C, yielding 1.8 gm of the hydrochloride having a melting point of 217°C which did not change upon further recrystallization from ethanol/ether.

EXAMPLE 57

2-(5''-Ethyl-furfuryl)-2'-hydroxy-5-ethyl-6,7-benzomorphan by method B

A mixture consisting of 2.17 gm (0.01 mol) of 2'-hydroxy-5-ethyl-6,7-benzomorphan, 1.1 gm of 30% formalin (0.011 mol formaldehyde), 1.06 gm (0.011 mol) of 2-ethylfuran and 10 ml of aqueous 50% acetic acid was stirred at room temperature for 15 hours, and the reaction solution was worked up as described in the preceding example. The residue of the chloroform phase evaporation was crystallized from acetone/water, yielding 1.6 gm (49% of theory) of the free base of the formula

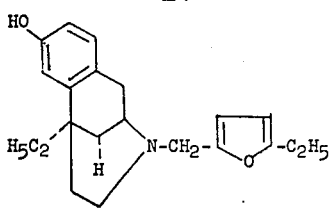

having a melting point of 158°C which rose to 161°C upon further recrystallization from acetone/water.

EXAMPLE 58

Using a procedure analogous to that described in Example 56(a), 37% of theory of 2-(5''-methyl-furfuryl)-2'-hydroxy-5-n-propyl-6,7-benzomorphan, m.p. 199°C, was obtained from 2'-hydroxy-5-n-propyl-6,7-benzomorphan, aqueous formaldehyde and 2-methyl-furan.

EXAMPLE 59

Using a procedure analogous to that described in Example 56(a), 42% of theory of 2-(5''-ethyl-furfuryl)-2'-hydroxy-5-methyl-6,7-benzomorphan, m.p. 169°C, was obtained from 2'-hydroxy-5-methyl-6,7-benzomorphan, aqueous formaldehyde and 2-ethyl-furan.

EXAMPLE 60

Using a procedure analogous to that described in Example 56, 74% of theory of 2-(5''-ethyl-furfuryl)-2'-hydroxy-5-n-propyl-6,7-benzomorphan hydrochloride, m.p. 188°C, was obtained from 2'-hydroxy-5-n-propyl-6,7-benzomorphan, aqueous formaldehyde and 2-ethyl-furan.

EXAMPLE 61

Using a procedure analogous to that described in Example 56(a), 2-(5''-methyl-furfuryl)-2'-methoxy-5-methyl-6,7-benzomorphan was prepared from 2'-methoxy-5-methyl-6,7-benzomorphan, aqueous formaldehyde and 2-methyl-furan.

EXAMPLE 62

Using a procedure analogous to that described in Example 56(a), 2-(5''-methyl-furfuryl)-2'-acetoxy-5-n-propyl-6,7-benzomorphan was prepared from 2'-acetoxy-5-n-propyl-6,7-benzomorphan, aqueous formaldehyde and 2-methyl-furan.

EXAMPLE 63

Using a procedure analogous to that described in Example 56(a), 2-(5''-ethyl-furfuryl)-2'-methoxy-5-methyl-6,7-benzomorphan was prepared from 2'-methoxy-5-methyl-6,7-benzomorphan, aqueous formaldehyde and 2-ethyl-furan.

EXAMPLE 64

Using a procedure analogous to that described in Example 56(a), 2-(5''-ethyl-furfuryl)-2'-acetoxy-5-n-propyl-6,7-benzomorphan was prepared from 2'-acetoxy-5-n-propyl-6,7-benzomorphan, aqueous formaldehyde and 2-ethyl-furan.

EXAMPLE 65

2-Furfuryl-2'-hydroxy-5-ethyl-6,7-benzomorphan and its hydrochloride by method C 2.17 gm (0.01 mol) of 2'-hydroxy-5-ethyl-6,7-benzomorphan and 1.92 gm (0.02 mol) of freshly distilled furfurol were dissolved in 150 ml of methanol, and the resulting solution was immediately hydrogenated with hydrogen in the presence of 0.2 gm of palladized charcoal (10% Pd) at atmospheric pressure, accompanied by shaking. After the calculated amount of hydrogen had been absorbed, the hydrogenation was terminated, the reaction solution was filtered, and the filtrate was evaporated. The brown residue was briefly refluxed with a mixture of chloroform/methanol/concentrated ammonia (90:10:0.1), the insoluble matter was filtered off, and the filtrate was chromatographed on a silicagel (300 gm) column, using the above chloroform/methanol/ammonia mixture as the solvent system. The eluate fractions containing the reaction product were combined and evaporated in vacuo. The residue, 2-furfuryl-2'-hydroxy-5-methyl-6,7-benzomorphan, was converted into its hydrochloride as described in Example 1(b), yielding 0.8 gm (24% of theory) of the hydrochloride, m.p. 242°C.

EXAMPLE 66

Using a procedure analogous to that described in Example 65, 2-(3''-ethyl-furfuryl)-2'-hydroxy-5-ethyl-6,7-benzomorphan was prepared by catalytic hydrogenation of 2'-hydroxy-5-ethyl-6,7-benzomorphan in the presence of 3-ethylfurfurol.

EXAMPLE 67

Using a procedure analogous to that described in Example 65, 2-(4''-ethyl-furfuryl)-2'-hydroxy-5-n-propyl-6,7-benzomorphan was prepared by catalytic hydrogenation of 2'-hydroxy-5-n-propyl-6,7-benzomorphan in the presence of 4-ethyl-furfurol.

EXAMPLE 68

Using a procedure analogous to that described in Example 65, 2-(5''-methyl-furfuryl)-2'-hydroxy-5-ethyl-6,7-benzomorphan was prepared by catalytic hydrogenation of 2'-hydroxy-5-ethyl-6,7-benzomorphan in the presence of 5-methylfurfurol.

EXAMPLE 69

Using a procedure analogous to that described in Example 65, 2-furfuryl-2'-hydroxy-5-n-propyl-6,7-benzomorphan, m.p. 173°–174°C, was prepared by catalytic hydrogenation of 2'-hydroxy-5-n-propyl-6,7-benzomorphan in the presence of 5-chloro-furfurol, whereby the chloro-substituent on the furfuryl moiety was split off simultaneously with the reductive alkylation.

EXAMPLE 70

2-(3''-Methyl-furfuryl)-2'-hydroxy-5-methyl-6,7-benzomorphan by method D a. 2.05 gm (0.01 mol) of 2'-hydroxy-5-methyl-6,7-benzomorphan were dissolved in 35 ml of warm methanol, and, while stirring, the warm solution was admixed with a solution of 2.5 gm of potassium carbonate in 4 ml of water. The mixed solution was allowed to cool to 20°C, and then 1.74 gm (0.011 mol) of 3-methyl-furan-2-carboxylic acid chloride were added over a period of 10 minutes, and the resulting mixture was vigorously stirred for five hours. Thereafter, the methanol was evaporated in vacuo, the residue was shaken with a mixture of chloroform and water, and the chloroform phase was separated, washed first with 2 N hydrochloric acid and then twice with water, dried with sodium sulfate and evaporated in vacuo. In order to remove residual traces of water and chloroform, the residue was dissolved in absolute methanol and the solution was again evaporated, leaving substantially pure 2-(3''-methyl-furoyl)-2'-hydroxy-5-methyl-6,7-benzomorphan.

b. The end product obtained in (a) was dissolved in 50 ml of absolute tetrahydrofuran and, while stirring and cooling, the solution was added dropwise to a suspension of 0.76 gm (0.02 mol) of lithium aluminum hydride in 25 ml of tetrahydrofuran at 5° to 10°C. The resulting mixture was stirred overnight at room temperature, and then, while cooling it on an ice bath and vigorously stirring it, 1.5 ml of water were added dropwise and subsequently 75 ml fo a saturated aqueous diammonium tartrate solution were added, and the resulting mixture was stirred for one hour. Thereafter, the organic phase was allowed to separate from the aqueous phase in a separating funnel, and the tetrahydrofuran (upper) phase was isolated and evaporated in vacuo. The aqueous phase was washed three times with 25 ml of chloroform each, the chloroform extracts were combined, the residue from the evaporation of the tetrahydrofuran phase was dissolved therein, and the resulting chloroformic solution was washed with water, dried with sodium sulfate and evaporated in vacuo. The residue was crystallized first from petroleum ether and then from methanol/water, yielding 1.7 gm (57% of theory) of 2-(3''-methyl-furfuryl)-2'-hydroxy-5-methyl-6,7-benzomorphan having a melting point of 162°C which remained unchanged upon further recrystallization.

EXAMPLE 71

2-(3''-Methyl-furfuryl)-2'-hydroxy-5-n-propyl-6,7-benzomorphan by method D a. 2.3 gm (0.01 mol) of 2'-hydroxy-5-n-propyl-6,7-benzomorphan were suspended in 23 ml of absolute methylene chloride, 4 ml of triethylamine were added to the suspension, and then, while stirring the mixture, 3.2 gm (0.022 mol) of 3-methyl-furan-2-carboxylic acid chloride were added dropwise thereto, and the resulting mixture was refluxed for four hours. Thereafter, the reaction solution was washed, in the presence of ice, first twice with 10 ml of 2 N hydrochloric acid each and then three times with water, and the methylene chloride phase was dried with sodium sulfate and then evaporated. In order to remove residual traces of methylene chloride and water, the residue was redissolved in absolute benzene, and the solution was again evaporated in vacuo, leaving substantially pure N,O-di-(3''-methyl-2''-furoyl)-2'-hydroxy-5-n-propyl-6,7-benzomorphan.

b. The end product obtained in (a) was reduced with 0.76 gm (0.02 mol) of lithium aluminum hydride in a manner analogous to that described in Example 70(b), which yielded 2.2 gm (67.5% of theory) of 2-(3''-methyl-furfuryl)-2'-hydroxy-5-n-propyl-6,7-benzomorphan, m.p. 120°C.

EXAMPLE 72

Using a procedure analogous to that described in Example 70, 2-(3''-methyl-furfuryl)-2'-hydroxy-5-ethyl-6,7-benzomorphan hydrochloride, m.p. 171°C, was prepared from 2'-hydroxy-5-ethyl-6,7-benzomorphan and 3-methyl-furan-2-carboxylic acid chloride. The yield was 21.5% of theory.

EXAMPLE 73

Using a procedure analogous to that described in Example 70, 2-(4''-methyl-furfuryl)-2'-hydroxy-5-ethyl-6,7-benzomorphan hydrochloride, m.p. 214°C, was prepared from 2'-hydroxy-5-ethyl-6,7-benzomorphan and 4-methyl-furan-2-carboxylic acid chloride. The yield was 57.5% of theory.

EXAMPLE 74

Using a procedure analogous to that described in Example 70, 2-[4''-methyl-furylmethyl-(3'')]-2'-hydroxy-5-methyl-6,7-benzomorphan hydrochloride, m.p. 278°C, was prepared from 2'-hydroxy-5-ethyl-6,7-benzomorphan and 4-methyl-furan-3-carboxylic acid chloride. The yield was 60% of theory.

EXAMPLE 75

Using a procedure analogous to that described in Example 70, 2-[5''-methyl-furylmethyl-(3'')]-2'-hydroxy-5-ethyl-6,7-benzomorphan hydrochloride, m.p. 218°C, was prepared from 2'-hydroxy-5-ethyl-6,7-benzomorphan and 5-methylfuran-3-carboxylic acid chloride. The yield was 58% of theory.

EXAMPLE 76

Using a procedure analogous to that described in Example 70, 2-(3''-methyl-furfuryl)-2'-methoxy-5-methyl-6,7-benzomorphan was prepared from 2'-methoxy-5-methyl-6,7-benzomorphan and 3-methyl-furan-2-carboxylic acid chloride.

EXAMPLE 77

Using a procedure analogous to that described in Example 70, 2-(5''-methyl-furfuryl)-2'-methoxy-5-n-propyl-6,7-benzomorphan was prepared from 2'-methoxy-5-n-propyl-6,7-benzomorphan and 3-methyl-furan-2-carboxylic acid.

EXAMPLE 78

Using a procedure analogous to that described in Example 70, 2-[furylmethyl-(3'')]-2'-methoxy-5-ethyl-benzomorphan was prepared from 2'-methoxy-5-ethyl-6,7-benzomorphan and furan-3-carboxylic acid chloride.

EXAMPLE 79

Using a procedure analogous to that described in Example 70, 2-[4''-methyl-furylmethyl-(3'')]-2'-hydroxy-5-ethyl-6,7-benzomorphan hydrochloride, m.p. 278°C, was prepared by reacting 2'-benzyloxy-5-ethyl-6,7-benzomorphan with 4-methylfuran-3-carboxylic acid chloride, reducing the 2-[4''-methyl-furoyl-(3'')]-2'-benzyloxy-5-ethyl-6,7-benzomorphan formed thereby with lithium aluminum hydride to form 2-[4''-methyl-furylmethyl-(3'')]-2'-benzyloxy-5-ethyl-6,7-benzomorphan, removing the protective benzyl group in the 2'-position of the latter by catalytic hydrogenation, and converting the free base product into its hydrochloride.

EXAMPLE 80

2-[2''-Methyl-furylmethyl-(3'')]-2'-methoxy-5-ethyl-6,7-benzomorphan was prepared by methylating 2-[2''-methyl-furylmethyl-(3'')]-2'-hydroxy-5-ethyl- 6,7-benzomorphan (the end product of Example 46) with diazomethane in tetrahydrofuran/ether.

EXAMPLE 81

2-[2″-Methyl-furylmethyl-(3″)]-2′-acetoxy-5-ethyl-6,7-benzomorphan was prepared by acetylating 2-[2″-methyl-furylmethyl-(3″)]-2′-hydroxy-5-ethyl-6,7-benzomorphan with acetyl chloride in pyridine.

EXAMPLE 82

Using a procedure analogous to that described in Example 1(a), 2-furfuryl-2′-hydroxy-5-n-butyl-6,7-benzomorphan, m.p. 158°–160°C, of the formula

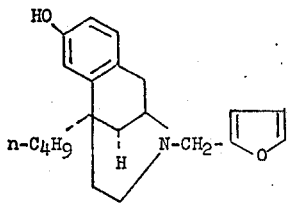

was prepared from 2′-hydroxy-5-n-butyl-6,7-benzomorphan and furfuryl chloride. The yield was 56% of theory.

EXAMPLE 83

Using a procedure analogous to that described in Example 70, 45% of theory of 2-furfuryl-2′-hydroxy-6,7-benzomorphan of the formula

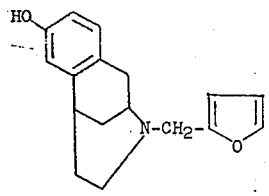

was obtained from 1.42 gm of 2′-hydroxy-6,7-benzomorphan and furan-2-carboxylic acid chloride. Its hydrochloride had a melting point of 191°–192°C after recrystallization from ethanol/ether.

EXAMPLE 84

Using a procedure analogous to that described in Example 38, 67% of theory of 2-[furylmethyl-(3″)]-2′-hydroxy-6,7-benzomorphan was obtained from 1.42 gm of 2′-hydroxy-6,7-benzomorphan and 3-chloromethyl-furan. Its hydrochloride had a melting point of 239° to 240°C after recrystallization from ethanol/ether.

EXAMPLE 85

Using a procedure analogous to that described in Example 71, 70% of theory of 2-[2″-methyl-furylmethyl-(3″)]-2′-hydroxy-6,7-benzomorphan was obtained from 2′-hydroxy-6,7-benzomorphan and 2-methyl-furan-3-carboxylic acid chloride. Its hydrochloride had a melting point of 222°–223°C after recrystallization from ethanol/ether.

EXAMPLE 86

Using a procedure analogous to that described in Example 70, 52% of theory of 2′-(3″-methyl-furfuryl)-2′-hydroxy-6,7-benzomorphan was obtained from 2′-hydroxy-6,7-benzomorphan and 3-methyl-furan-2-carboxylic acid chloride. Its hydrochloride had a melting point of 235°–236°C.

The compounds embraced by formula I above and their non-toxic, pharmacologically acceptable acid addition salts, have useful pharmacodynamic properties. More particularly, they exhibit opiate antagonistic, non-narcotic analgesic and antitussive activities in warm-blooded animals, such as mice and rats.

The compounds of the formula I were tested for analgesic activity in mice and rats by various standard pharmacological test methods, namely:

1. The Haffner method [Deutsche Medizinische Wochenschrift 55, 731 (1929)];
2. The "hot-plate" method [J. Pharmacol. exp. Therap. 80, 300 (1944)]; and
3. The writhing test [J. Pharmacol. exp. Therap. 154, 319 (1966)].

In the Haffner test, they were found to be inactive. However, in the hot-plate test and the writhing test they exhibited distinct dose-dependent analgesic activities. In accordance with prevailing teachings [Adv. Chem. Ser. 49, 162–169 (1964)], analgesic inactivity in the Haffner test is normally an indication that the compounds possess no morphine-like physical dependence capacity, i.e., do not produce narcotic addiction. On the other hand, however, analgesic activity in the hot-plate test and the writhing test proves that they are effective analgesics.

For pharmaceutical purposes the compounds of the formula I or their non-toxic acid addition salts are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective analgesic and antitussive dosage unit of the compounds of the formula I or their non-toxic salts is from 0.166 to 5.0 mgm/kg body weight, preferably 0.83 to 2.5 mgm/kg body weight.

The following examples illustrate a few pharmaceutical dosage unit compositions comprising a compound of the formula I or a non-toxic acid addition salt thereof as an active ingredient and represent the best modes contemplated of putting the invention into practical use. The parts are parts by weight unless otherwise specified.

EXAMPLE 87

Tablets

The tablet composition is compounded from the following ingredients:

| | |
|---|---|
| 2-Furfuryl-2′-hydroxy-α-5,9-dimethyl-6,7-benzomorphan | 50.0 parts |
| Lactose | 95.0 parts |

-Continued

| | | |
|---|---|---|
| Corn starch | 45.0 | parts |
| Colloidal silicic acid | 2.0 | parts |
| Soluble starch | 5.0 | parts |
| Magnesium stearate | 3.0 | parts |
| Total | 200.0 | parts |

Preparation:

The benzomorphan compound is intimately admixed with the lactose and the corn starch, the mixture is moistened with an aqueous 10% solution of the soluble starch, the moist mass is forced through a 1 mm-mesh screen, the resulting granulate is dried at 40°C, the dry granulate is admixed with the colloidal silicic acid, and the composition is compressed into 200 mgm-tablets in a conventional tablet making machine. Each tablet contains 50 mgm of the benzomorphan compound and is an oral dosage unit composition with effective analgesic and antitussive actions.

EXAMPLE 88

Coated pills

The pill core composition is compounded from the following ingredients:

| | | |
|---|---|---|
| 2-Furfuryl-2'-hydroxy-α-5,9-dimethyl-6,7-benzomorphan hydrochloride | 75.0 | parts |
| Lactose | 100.0 | parts |
| Corn starch | 65.0 | parts |
| Colloidal silicic acid | 2.0 | parts |
| Soluble starch | 5.0 | parts |
| Magnesium stearate | 3.0 | parts |
| Total | 250.0 | parts |

Preparation:

The ingredients are compounded in the same manner as in Example 87, and the composition is compressed into 250 mgm-pill cores which are subsequently coated with a thin shell consisting essentially of a mixture of sugar, talcum and gum arabic and finally polished with beeswax. Each coated pill contains 75 mgm of the benzomorphan compound and is an oral dosage unit composition with effective analgesic and antitussive activities.

EXAMPLE 89

Suppositories

The suppository composition is compounded from the following ingredients:

| | | |
|---|---|---|
| 2-[2''-Methyl-furylmethyl-(3'')]-2'-hydroxy-α-5,9-dimethyl-6,7-benzomorphan | 50.0 | parts |
| Lactose | 250.0 | parts |
| Suppository base (e.g. cocoa butter) | 1400.0 | parts |
| Total | 1700.0 | parts |

Preparation:

The benzomorphan compound is intimately admixed with the lactose, and the mixture is blended with the aid of an immersion homogenizer into the suppository base which had previously been melted and cooled to about 40°C. 1700 mgm-portions of the composition are poured into cooled suppository molds and allowed to harden therein. Each suppository contains 50 mgm of the benzomorphan compound and is a rectal dosage unit composition with effective analgesic and antitussive actions.

EXAMPLE 90

Hypodermic solution

The solution is compounded from the following ingredients:

| | | |
|---|---|---|
| 2-Furfuryl-2'-hydroxy-α-5,9-dimethyl-6,7-benzomorphan methanesulfonate | 75.0 | parts |
| Sodium chloride | 5.0 | parts |
| Double-distilled water q.s.ad | 2000.0 | parts by vol. |

Preparation:

The benzomorphan compound and the sodium chloride are dissolved in the double-distilled water, the solution is filtered until free from suspended particles, and the filtrate is filled under aseptic conditions into 2 cc-ampules which are subsequently sterilized and sealed. Each ampule contains 75 mgm of the benzomorphan compound, and its contents are an injectable dosage unit composition with effective analgesic and antitussive actions.

EXAMPLE 91

Drop solution

The solution is compounded from the following ingredients:

| | | |
|---|---|---|
| 2-Furfuryl-2'-hydroxy-α-5,9-dimethyl-6.7-benzomorphan | 0.70 | parts |
| Methyl p-hydroxy-benzoate | 0.07 | parts |
| Propyl p-hydroxy-benzoate | 0.03 | parts |
| Demineralized water q.s.ad | 100.0 | parts by vol. |

Preparation:

The benzomorphan compound and the p-hydroxy-benzoates are dissolved in the demineralized water, the solution is filtered, and the filtrate is filled into 100 ml-bottles. 10 ml of the solution contain 70 mgm of the benzomorphan compound and are an oral dosage unit composition with effective analgesic and antitussive actions.

Analogous results are obtained when any one of the other benzomorphans embraced by formula I or a non-toxic acid addition salt thereof is substituted for the particular benzomorphan in Examples 87 through 91. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made withour departing from the spirit of the invention or the scope of the appended claims.

We claim:

1. A pharmaceutical dosage unit composition having analgesic and antitussive activity consisting essentially of an inert pharmaceutical carrier and an effective analgesic or antitussive amount of a racemic mixture of a compound of the formula

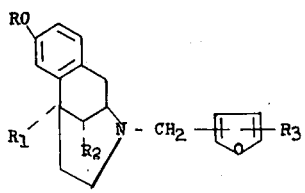

wherein
R is hydrogen, methyl or acetyl,
R₁ is hydrogen, methyl, ethyl, n-propyl, isopropyl or butyl, and
R₂ and R₃ are each hydrogen, methyl or ethyl;
or an optically active isomer component thereof; or a non-toxic, pharmacologically acceptable acid addition salt of said racemic mixture or optically active isomer.

2. A composition of claim 1,
wherein
R is hydrogen,
R₁ is hydrogen, methyl, ethyl, n-propyl, isopropyl or n-butyl, and
R₂ and R₃ are each hydrogen, methyl or ethyl.

3. A composition of claim 1, wherein said compound is 2-furfuryl-2'-hydroxy-α-5,9-dimethyl-6,7-benzomorphan or a non-toxic, pharmacologically acceptable acid addition salt thereof.

4. A composition of claim 1, wherein said compound is 2-[3''-methyl-furylmethyl-(2'')]-2'-hydroxy-α-5,9-dimethyl-6,7-benzomorphan or a non-toxic, pharmacologically acceptable acid addition salt thereof.

5. A composition of claim 1, wherein said compound is 2-[2''-methyl-furylmethyl-(3'')]-2'-hydroxy-α-5,9-dimethyl-6,7-benzomorphan or a non-toxic, pharmacologically acceptable acid addition salt thereof.

6. A composition of claim 1, wherein said compound is 2-furfuryl-2'-hydroxy-5-ethyl-6,7-benzomorphan or a non-toxic, pharmacologically acceptable acid addition salt thereof.

7. A composition of claim 1, wherein said compound is 2-furfuryl-2'-hydroxy-5-methyl-6,7-benzomorphan or a non-toxic, pharmacologically acceptable acid addition salt thereof.

8. A composition of claim 1, wherein said compound is 2-(3''-methyl-furfuryl)-2'-hydroxy-5-ethyl-6,7-benzomorphan or a non-toxic, pharmacologically acceptable acid addition salt thereof.

9. A composition of claim 1, wherein said compound is 2-(3''-methyl-furfuryl)-2'-hydroxy-5-methyl-6,7-benzomorphan or a non-toxic, pharmacologically acceptable acid addition salt thereof.

10. A composition of claim 1, wherein said compound is 2-[2''-methyl-furylmethyl-(3'')]-2'-hydroxy-5-ethyl-6,7-benzomorphan or a non-toxic, pharmacologically acceptable acid addition salt thereof.

11. A composition of claim 1, wherein said compound is 2-[2''-methyl-furylmethyl-(3'')]-2'-hydroxy-5-methyl-6,7-benzomorphan or a non-toxic, pharmacologically acceptable acid addition salt thereof.

12. The method of alleviating pain or suppressing the cough reflex in a warm-blooded animal in need of such treatment, which comprises perorally, parentarally or rectally administering to said animal an effective analgesic or antitussive amount of a racemic mixture of a compound of the formula

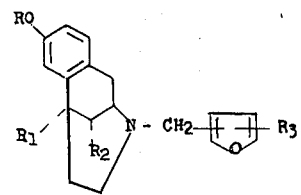

wherein
R is hydrogen, methyl or acetyl,
R₁ is hydrogen, methyl, ethyl, n-propyl, isopropyl or butyl, and
R₂ and R₃ are each hydrogen, methyl or ethyl;
or an optically active isomer component thereof; or a nontoxic, pharmacologically acceptable acid addition salt of said racemic mixture or optically active isomer.

13. The method of claim 12,
wherein
R is hydrogen,
R₁ is hydrogen, methyl, ethyl, n-propyl, isopropyl or n-butyl, and
R₂ and R₃ are each hydrogen, methyl or ethyl.

* * * * *

PO-1050
(5/69)

UNITED STATES PATENT OFFICE
CERTIFICATE OF CORRECTION

Patent No. 3,887,686        Dated June 3, 1975

Inventor(s) HERBERT MERZ, ADOLF LANGBEIN, HELMUT WICK and KLAUS STOCKHAUS

It is certified that error appears in the above-identified patent and that said Letters Patent are hereby corrected as shown below:

| | |
|---|---|
| Col. 9, line 55 | "5,91" should read -- 5,9- -- |
| Col. 10, line 9 | After ")" insert -- ] -- |
| Col. 10, line 26 | "2''" should read -- 2' -- |
| Col. 10, line 28 | "2''" should read -- 2' -- |
| Col. 10, line 30 | "2''" should read -- 2' -- |
| Col. 15, line 46 | "(3"-]" should read -- (3")] -- |
| Col. 17, line 4 | "2-[3"-" should read -- 2-[2"- -- |
| Col. 19, line 57 | "-(3"-methyl-2"-furoyloxy)-" should read -- -(3'''-methyl-2'''-furoyloxy) -- |

Signed and Sealed this twenty-sixth Day of August 1975

[SEAL]

Attest:

RUTH C. MASON
Attesting Officer

C. MARSHALL DANN
Commissioner of Patents and Trademarks